US012679214B2

(12) United States Patent
De Buretel De Chassey et al.

(10) Patent No.: US 12,679,214 B2
(45) Date of Patent: Jul. 14, 2026

(54) PANTOGRAPH POSITIONING SYSTEM

(71) Applicant: Wabtec Hauts-de-France, Saint-Pierre-des-Corps CEDEX (FR)

(72) Inventors: Henri Guillaume Marie De Buretel De Chassey, Piossasco (IT); Philippe Geoffroy, Ballan Mire (FR); Santosh Reddy Sama, Erie, PA (US); Brett Daniel Heher, Pittsburgh, PA (US)

(73) Assignees: WABTEC Hauts-de-France, Amiens (FR); Saint-Pierre-des-Corps, Cedex (FR)

(*) Notice: Subject to any disclaimer, the term of this patent is extended or adjusted under 35 U.S.C. 154(b) by 791 days.

(21) Appl. No.: 18/053,199

(22) Filed: Nov. 7, 2022

(65) Prior Publication Data

US 2023/0090618 A1 Mar. 23, 2023

Related U.S. Application Data

(63) Continuation-in-part of application No. 17/067,966, filed on Oct. 12, 2020, now Pat. No. 11,565,590.
(Continued)

(30) Foreign Application Priority Data

Oct. 24, 2019 (FR) ..................................... 1911918

(51) Int. Cl.
| | |
|---|---|
| *B60L 5/32* | (2006.01) |
| *B60L 5/24* | (2006.01) |
| *B60L 5/28* | (2006.01) |

(52) U.S. Cl.
CPC ................... *B60L 5/32* (2013.01); *B60L 5/24* (2013.01); *B60L 5/28* (2013.01); *B60L 2200/26* (2013.01)

(58) Field of Classification Search
CPC .......... B60L 2200/26; B60L 5/32; B60L 5/24; B60L 5/28; B60L 5/16; B60L 5/205
See application file for complete search history.

(56) References Cited

U.S. PATENT DOCUMENTS

| | | | | |
|---|---|---|---|---|
| 1,222,479 | A | * | 4/1917 | Simmon ................... B60L 5/32 191/65 |
| 11,565,590 | B2 | * | 1/2023 | Geoffroy ................... B60L 5/28 |

(Continued)

FOREIGN PATENT DOCUMENTS

| | | | | |
|---|---|---|---|---|
| CN | 2568463 | Y | * | 8/2003 |
| CN | 202345420 | U | * | 7/2012 |

(Continued)

OTHER PUBLICATIONS

First Office Action mailed Sep. 11, 2023 for corresponding Chinese Application No. 202011141811.5 (12 pages).

(Continued)

*Primary Examiner* — Cheng Lin
(74) *Attorney, Agent, or Firm* — K&L Gates LLP

(57) ABSTRACT

A pantograph positioning system may include a contact strip, a main valve, a supply line, at least one feeder line, and a detection line. The contact strip may be fastened to a pantograph and equipped with a wear detection circuit supplied a fluid. The main valve may include a pilot chamber and a secondary chamber, which are separated by a membrane. The membrane may be movable between a closed position, in which the membrane blocks an outlet aperture of the secondary chamber, and an open position, in which the membrane does not block the outlet aperture, allowing evacuation of the fluid. The supply line may supply the fluid to the secondary chamber of the main valve. The at least one feeder line may feed the fluid to the pilot chamber. The (Continued)

detection line may extend from the pilot chamber to the wear detection circuit of the contact strip.

10 Claims, 11 Drawing Sheets

Related U.S. Application Data

(60) Provisional application No. 63/345,320, filed on May 24, 2022.

(56) References Cited

U.S. PATENT DOCUMENTS

| | | | |
|---|---|---|---|
| 2016/0282061 A1 | 9/2016 | Veilleux et al. | |
| 2016/0298662 A1 | 10/2016 | Taylor | |
| 2019/0202295 A1* | 7/2019 | Engström | B60L 5/36 |

FOREIGN PATENT DOCUMENTS

| | | | | | |
|---|---|---|---|---|---|
| CN | 105416076 | A | * | 3/2016 | B60L 5/32 |
| CN | 105416076 | U | | 3/2016 | |
| CN | 206703433 | U | * | 12/2017 | |
| CN | 208149090 | U | * | 11/2018 | |
| CN | 112706619 | A | | 4/2021 | |
| EP | 0311048 | A1 | * | 4/1989 | B60L 5/28 |
| GB | 1374972 | A | * | 11/1974 | B60L 5/205 |
| WO | WO-2015112174 | A1 | * | 7/2015 | B60L 5/32 |

OTHER PUBLICATIONS

Extended European Search Report for related EP App No. 23174277 dated Nov. 7, 2023 (7 pages).

* cited by examiner

[Fig. 1]
[Fig. 2]
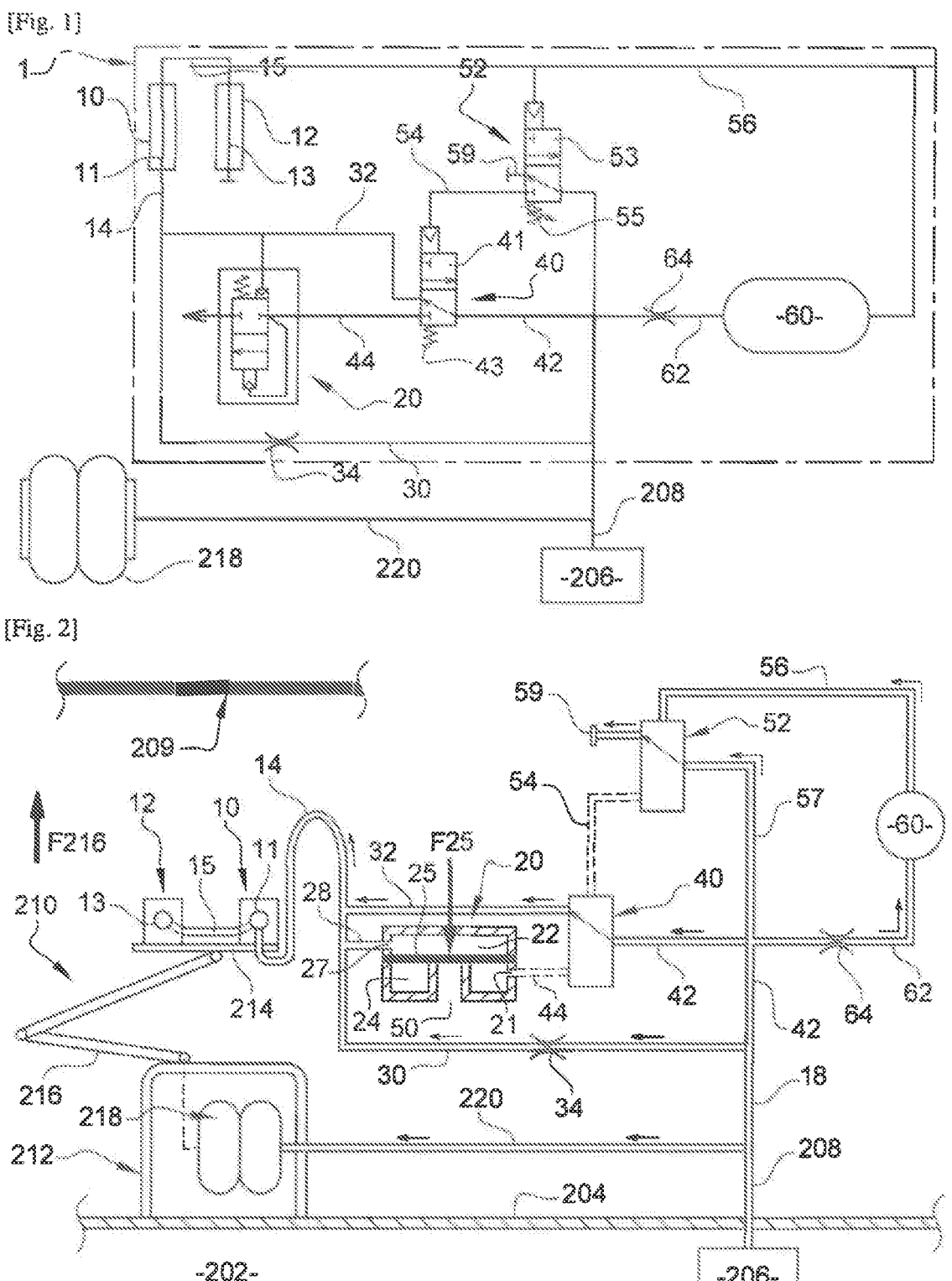

[Fig. 3]
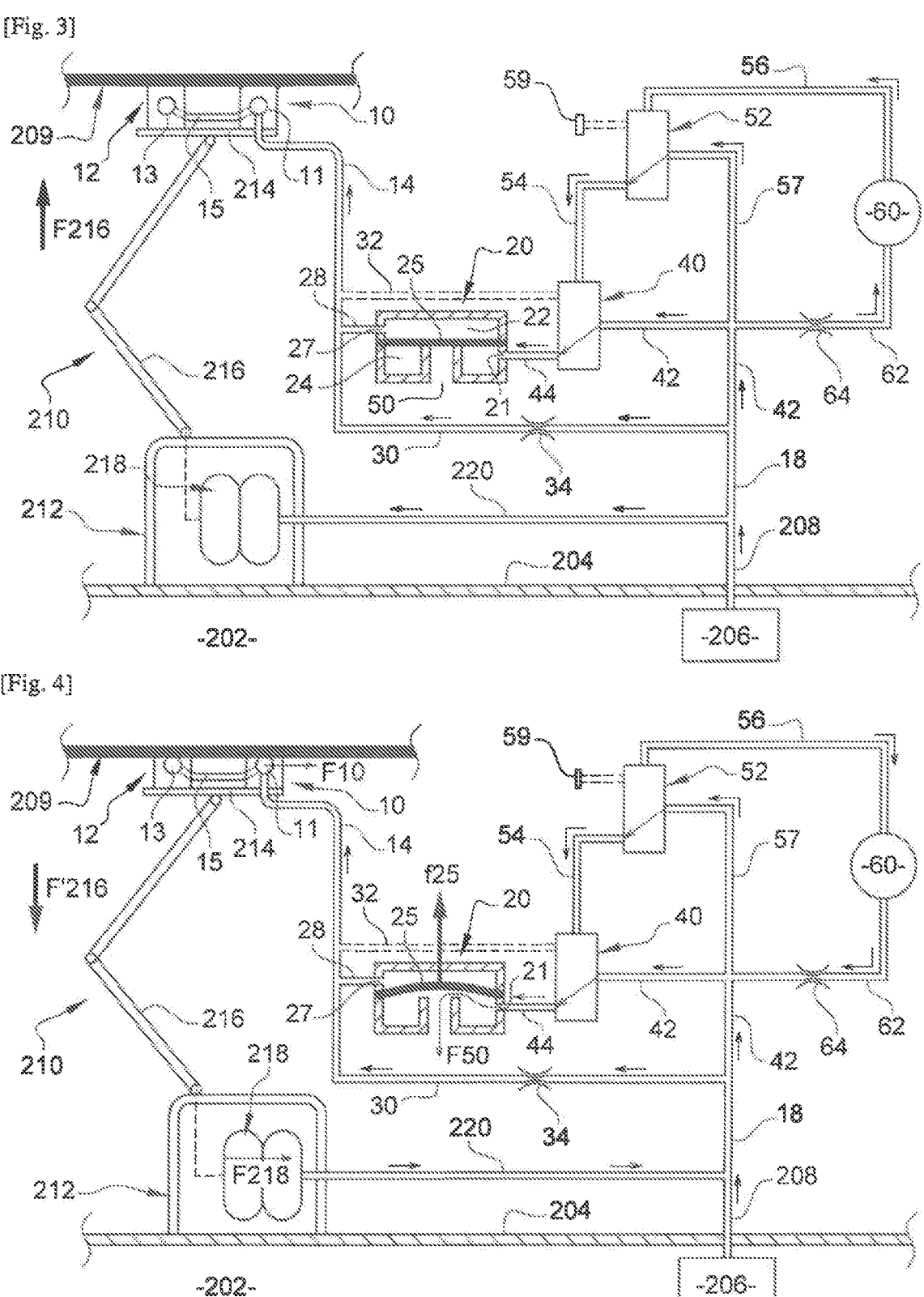
[Fig. 4]

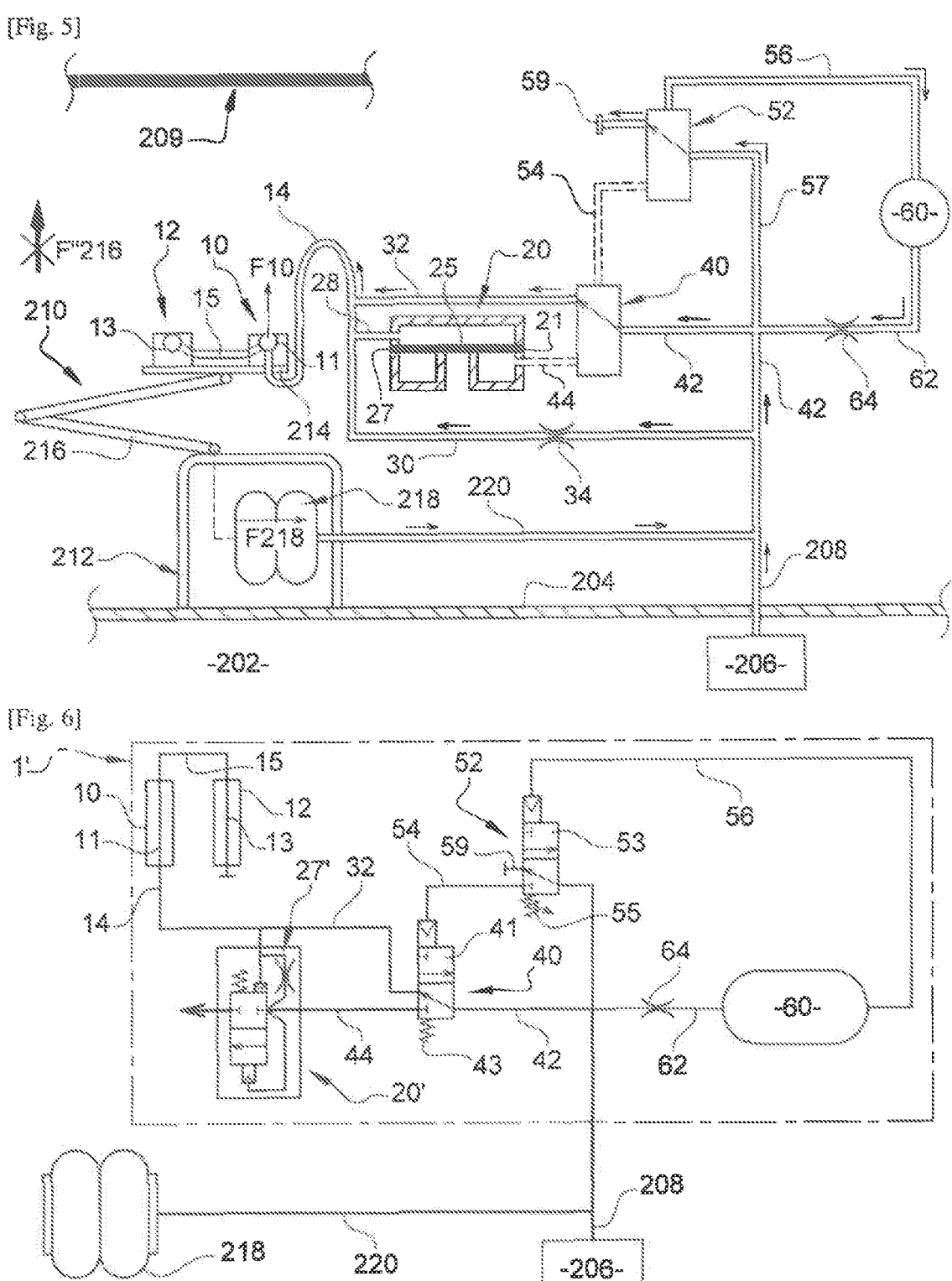
[Fig. 5]
[Fig. 6]

[Fig. 7]
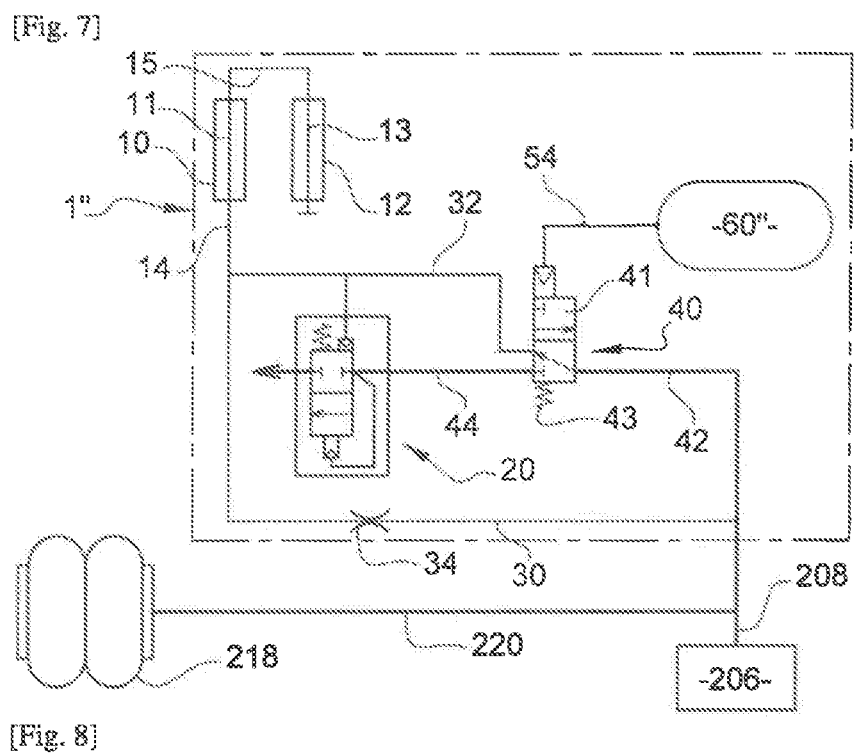
[Fig. 8]
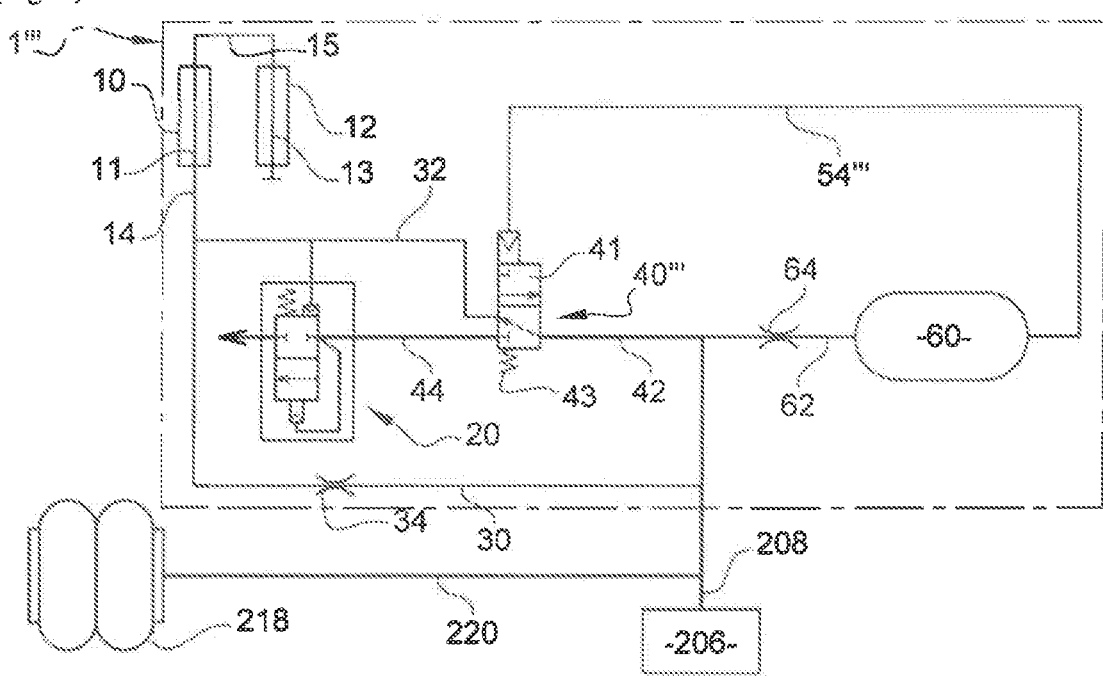

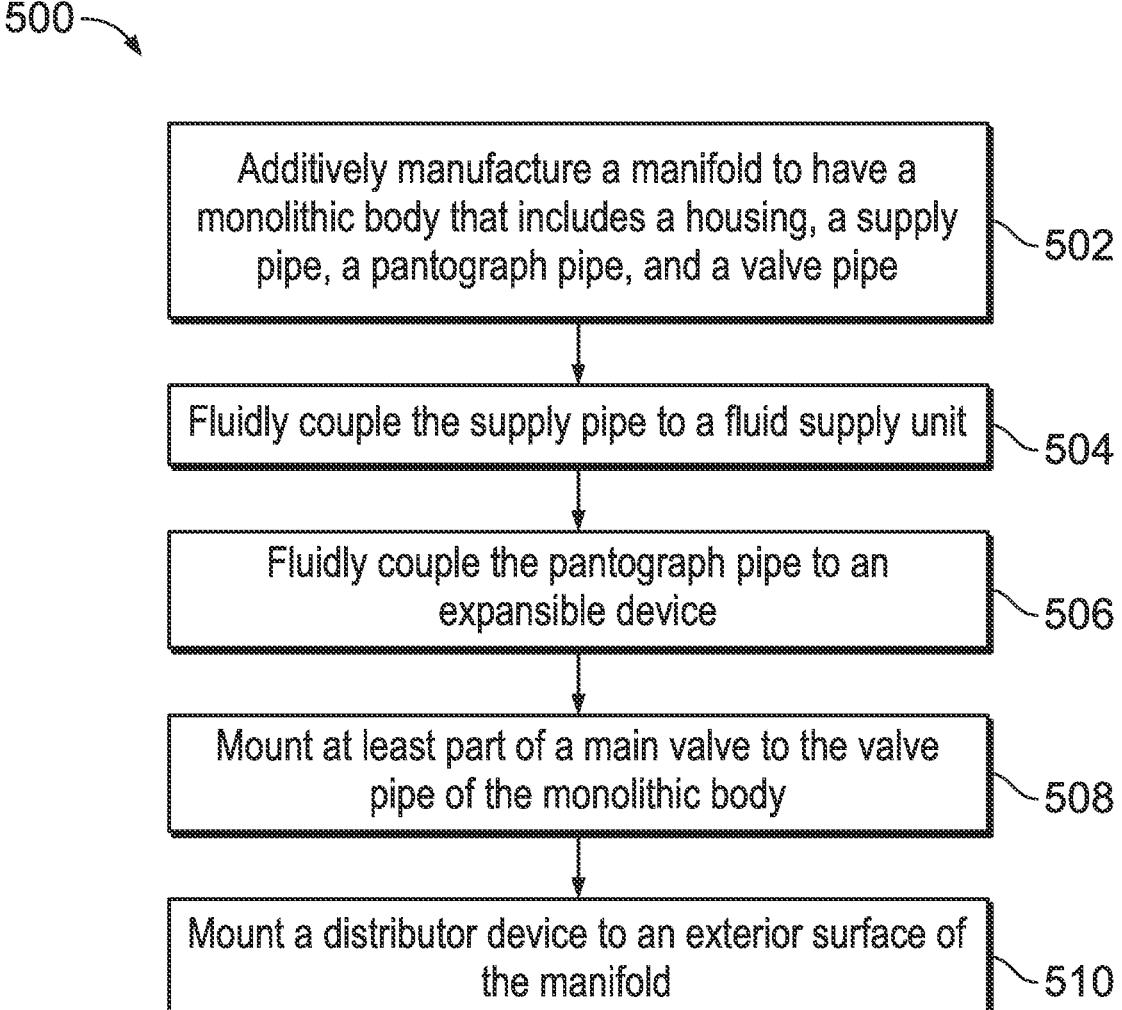

500

Additively manufacture a manifold to have a monolithic body that includes a housing, a supply pipe, a pantograph pipe, and a valve pipe — 502

Fluidly couple the supply pipe to a fluid supply unit — 504

Fluidly couple the pantograph pipe to an expansible device — 506

Mount at least part of a main valve to the valve pipe of the monolithic body — 508

Mount a distributor device to an exterior surface of the manifold — 510

FIG. 18

PANTOGRAPH POSITIONING SYSTEM

CROSS-REFERENCE TO RELATED APPLICATIONS

This application is a continuation-in-part of U.S. application Ser. No. 17/067,966 (the "'966 Application"), which was filed on 12 Oct. 2020 and is entitled Rapid Descent Device For A Pantograph. The '966 Application claims priority to French patent application 1911918, which was filed on 24 Oct. 2019 and is now FR Pat. No. 3102414. This application also claims priority to U.S. Provisional Application No. 63/345,320 filed 24 May 2022. The entire disclosures of these applications are incorporated by reference herein.

BACKGROUND

Technical Field

The inventive subject matter described herein relates to the field of pantographs for vehicle power transfer. One or more embodiments are directed to a positioning system, such as a rapid descent device, that operably couples to a pantograph to control the positioning of the pantograph, and a method of implementing the positioning system.

Discussion of Art

A pantograph may have a chassis allowing the pantograph to be fastened to the body of a vehicle, such as a railroad vehicle. This chassis supports an articulated arm, the upper end of which receives a current-collector bow intended to come into contact with the overhead supply line. The current-collector bow includes one or more electrically conductive elements, referred to as collector shoes, that may physically contact one or more electrically conductive conductor bars (e.g., rails or tracks) of the supply line. The pantograph provides a sustained electrical connection between the vehicle and the supply line.

Due to the physical connection between the pantograph onboard the vehicle and the supply line off-board the vehicle, the pantograph and the supply line may become entangled, damaged, excessively worn, and/or the like. To reduce such risks, the vehicles may include positioning systems, often referred to as descent or drop devices, mechanically connected to the pantographs. The function of a descent device is to quickly and automatically drop or retract the pantograph out of contact with the supply line if triggered by a detected abnormal condition, to minimize damage resulting from abnormal condition.

The descent devices may include a pneumatic circuit that uses a fluid to raise or extend the pantograph and releases the fluid to quickly drop or retract the pantograph. Known descent devices are complex assemblies, including a significant number of connected parts. Each connection interface between parts represents a potential leak path that can form over time, reducing the performance and/or efficiency of the descent device. Such known descent devices may require maintenance or even replacement earlier than desired.

Furthermore, known descent devices may be prone to malfunction. In one example, the known descent devices may not reliably ensure the initial raising function of an articulated arm to place the pantograph in physical contact with the supply line. Failing to establish the electrical connection is particularly detrimental to the proper function of a vehicle network that relies on the power transfer between vehicles and the supply line. For example, it may force a vehicle, such as a train, to stop on the route, causing a delay for that vehicle and potentially other vehicles whose planned movements are interfered by the stopped vehicle.

It may be desirable to have a pantograph positioning system and method that differ from those that are currently available.

BRIEF SUMMARY

In accordance with an embodiment, a positioning system for a pantograph may include a contact strip, a main valve, a supply line, at least one feeder line, and a detection line. The contact strip may be fastened to a pantograph to contact a power line. The contact strip may be equipped with a wear detection circuit configured to be supplied a fluid. The main valve may include a pilot chamber and a secondary chamber, which are separated by a membrane. The main valve may define an outlet aperture fluidly connected to the secondary chamber. The membrane may be movable between a closed position, in which the membrane blocks the outlet aperture, and an open position, in which the membrane does not block the outlet aperture, allowing evacuation of the fluid from the main valve to the atmosphere. The supply line may be fluidly connected to a fluid supply unit and may supply the fluid to the secondary chamber of the main valve. The at least one feeder line may be fluidly connected to the fluid supply unit and may feed the fluid to the pilot chamber of the main valve. The detection line may extend from the pilot chamber of the main valve to the wear detection circuit of the contact strip.

In accordance with an embodiment, a positioning system for a pantograph includes a main valve and a manifold. The main valve may include a pilot chamber and a secondary chamber, which are separated from each other by a membrane. The main valve may define an outlet aperture fluidly connected to the secondary chamber. The membrane may be movable between a closed position, in which the membrane blocks the outlet aperture, and an open position, in which the membrane does not block the outlet aperture. The manifold may include a monolithic body defined by layers of material that are stacked and fused together. The monolithic body may include a housing and a valve pipe. The valve pipe may be connected to the main valve, and may define a portion of a first flow channel through the manifold to convey the fluid to the secondary chamber of the main valve. Actuation of the main valve from the closed position to the open position may allow the fluid in an expansible device, that is mechanically connected to the pantograph, to evacuate through the first flow channel of the manifold and through the outlet opening of the main valve, which retracts the pantograph.

In accordance with an embodiment, a positioning system for a pantograph includes a manifold that has a monolithic body defined by layers of material that are stacked and fused together. The monolithic body may include a housing, a supply pipe, a pantograph pipe, and a valve pipe. The housing may define a chamber configured to hold a fluid. The supply pipe may project from the housing and may connect to a fluid supply unit. The pantograph pipe may project from the housing and may connect to an expansible device mechanically connected to the pantograph. The valve pipe may project from the housing and may connect to a main valve that is actuatable to control flow of the fluid through the manifold.

In accordance with an embodiment, a positioning system for a pantograph includes a contact strip, a main valve, a manifold, and a detection line. The contact strip is configured to be fastened to a pantograph and to contact a power line. The contact strip is equipped with a wear detection circuit configured to be supplied a fluid. The main valve includes a pilot chamber and a secondary chamber, which are separated by a membrane. The main valve defines an outlet aperture fluidly connected to the secondary chamber. The membrane is movable between a closed position, in which the membrane blocks the outlet aperture, and an open position, in which the membrane does not block the outlet aperture, allowing evacuation of the fluid from the main valve to the atmosphere. The manifold includes a monolithic body defined by layers of material that are stacked and fused together. The monolithic body defines at least a portion of a supply line that is configured to be fluidly connected to a fluid supply unit and to supply the fluid to the secondary chamber of the main valve. The monolithic body also defines at least a portion of at least one feeder line that is configured to be fluidly connected to the fluid supply unit and to feed the fluid to the pilot chamber of the main valve. The detection line extends from the pilot chamber of the main valve to the wear detection circuit of the contact strip.

BRIEF DESCRIPTION OF THE DRAWINGS

The inventive subject matter will be described here below with reference to the attached drawings, given exclusively by way of non-limiting examples, where:

FIG. 1 is a pneumatics diagram of a pantograph positioning system, according to a first embodiment, mounted on a pantograph of a vehicle;

FIG. 2 is a profile view, in a dynamic state, illustrating circulation of pressurized fluid in the positioning system during initial raising of the pantograph;

FIG. 3 is a profile view, analogous to FIG. 2, illustrating fluid circulation in the positioning system during normal operation of the pantograph;

FIG. 4 is a profile view, analogous to FIG. 2, illustrating fluid circulation in the positioning system during an emergency retraction of the pantograph;

FIG. 5 is a profile view, analogous to FIG. 2, illustrating fluid circulation in the positioning system, once the pantograph has been fully lowered;

FIG. 6 is a pneumatics diagram analogous to FIG. 1, illustrating a pantograph positioning system according to a second embodiment;

FIG. 7 is a pneumatics diagram analogous to FIG. 1, illustrating a pantograph positioning system according to a third embodiment;

FIG. 8 is a pneumatics diagram analogous to FIG. 1, illustrating a pantograph positioning system according to a fourth embodiment;

4

Figure 17:
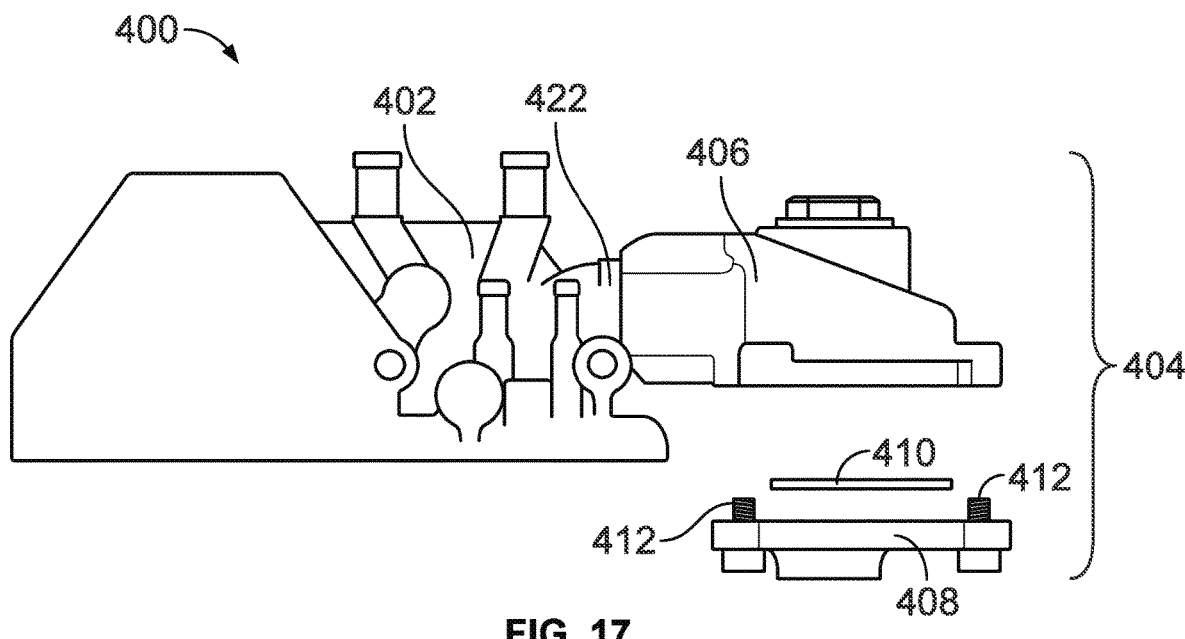

FIG. 17 is a front view of a manifold of the pantograph positioning system according to another embodiment; and FIG. 18 is a flow chart of a method for assembling a pantograph positioning system according to an embodiment.

DETAILED DESCRIPTION

Embodiments of the subject matter described herein relate to a positioning system for a pantograph. The positioning system may include or represent an auto-drop device and/or rapid descent device designed to quickly lower the pantograph in exigent circumstances. The positioning system includes a manifold that is connected to a distributor device, a main valve, and an expansible device. The expansible device is mechanically connected to the pantograph. Expansion of the expansible device raises or lifts the pantograph towards a catenary power supply line, which is off-board a moving assembly (e.g., a vehicle) that carries the pantograph, to establish an electrical connection. Compression of the expansible device enables the pantograph to lower or drop away from the power supply line. The manifold routes a fluid, such as air, through the distributor device, the main valve, and the expansible device, as explained in more detail herein. For example, in response to a leak event, an outlet opens in the main valve. Fluid within the expansible device is permitted to flow through the manifold and escape into the surrounding environment through the outlet. The escape of fluid from the expansible device allows the pantograph to drop relatively quickly. The positioning system described herein may enable a pantograph to drop at speeds of at least 20 cm per second, such as speeds of 30 cm per second or over 30 cm per second.

FIG. 1 illustrates a pneumatics diagram of a pantograph positioning system 1 according to an embodiment. FIG. 2 illustrates a schematic diagram of a vehicle 200 that includes the pantograph positioning system 1. The pantograph positioning system includes a pantograph 210 disposed on the vehicle. As shown in FIG. 2, the vehicle has a body 202, illustrated in a partial manner, with a roof 204. The vehicle is equipped with a fluid supply unit 206 that delivers a fluid, such as compressed air, to a main supply line 208. An overhead power line 209 extends above the vehicle. The overhead power line, which is partially illustrated, provides electrical power that can be transferred to the vehicle through the pantograph.

In an embodiment, the vehicle is a rail vehicle designed to travel on a railroad track. While one or more embodiments are described in connection with a rail vehicle system, not all embodiments are limited to rail vehicle systems. Unless expressly disclaimed or stated otherwise, the inventive subject matter described herein extends to other types of vehicles, such as buses, trucks (with or without trailers), automobiles, mining vehicles, agricultural vehicles, or other off-highway vehicles. The vehicles described herein (rail vehicles or other vehicles that do not travel on rails or tracks) can be part of a single vehicle system or a vehicle system of multiple vehicles. With respect to multi-vehicle systems, the vehicles can be mechanically coupled with each other (e.g., by couplers), or logically coupled but not mechanically coupled. For example, vehicles may be logically but not mechanically coupled when the discrete vehicles communicate with each other to coordinate movements of the vehicles with each other so that the vehicles travel together (e.g., as a convoy). The inventive subject matter described herein may also extend to non-vehicular powered systems that include multiple rechargeable battery packs to power operation of the powered systems. The powered systems may be located at manufacturing facilities and other industrial locations.

The pantograph is designed to harness the electrical current of the overhead power line and to supply electrical power to the vehicle. The pantograph may include a chassis 212, for mounting on the roof of the vehicle, as well as a current-collector bow 214 intended to come into contact with the overhead line. An articulated arm 216 links the chassis and the current-collector bow. The arm is movable between a retracted position, in which the arm is located in the vicinity of the roof, and a deployed position, in which the arm ensures contact of the current-collector bow and of the overhead line. The positioning system includes an expansible device (e.g., a deployment unit) 218 which controls the motion of the arm between the deployed position and the retracted position. The expansible device may include a cushion. The expansible device may be pneumatically fed by a feeder or supply line 220, which extends from the main supply line that is coupled to the fluid supply unit. The feeder line may convey pressurized fluid (e.g., compressed air) to the expansible device.

The pantograph positioning system may include a main valve 20, a distributor device 40, and a manifold. This positioning system includes different lines conveying pressurized fluid from the fluid supply unit 206 and circulating the fluid between the aforementioned mechanical elements. In FIG. 1, the mechanical elements of the positioning system are assigned reference numbers below the number 100.

The pantograph may include at least one contact strip (e.g., rub strip). In the illustrated embodiment, two identical contact strips 10 and 12 are provided. The pantograph can be equipped with more or less than two contact strips in other embodiments, such as a single contact strip. Each contact strip may include a respective surveillance circuit, referred to as a wear detection circuit 11, 13. Each wear detection circuit may include a tube traversing the respective contact strip in a lengthwise direction. The rupture or piercing of this tube may signal a worn or broken strip. One end of the detection circuit 11 may be fed by a line referred to as a detection line 14. In FIGS. 2 through 5, the detection line 14 is represented at an arm's length distance from the arm 216 of the pantograph for clarity. In practice, however, this line may be coupled to this arm 216 in a manner to adapt to variations in height of the pantograph. Moreover, the detection circuit 13 placed downstream of circuit 11, may be fed fluid from the other end of the circuit 11, by connection line 15. The distal end of the circuit 13 may be blocked off. Each contact strip may be fastened to the body of the current-collector bow 214, using appropriate means.

The main valve 20 may include two chambers referred to as a pilot chamber and a secondary chamber 24. The two chambers may be separated from each other by a membrane 25. The secondary chamber may be provided with an inlet aperture 21, as well as an outlet aperture 50. The pilot chamber 22 may be provided with a pilot aperture 27. As described below in more detail, the membrane 25 is movable between a first operational position, called the closed position, in which the membrane blocks off the outlet aperture, and a second operational position, called the open position, in which the membrane does not block off the outlet aperture. In the closed position, the valve may rest upon a seat 29, provided in the vicinity of the outlet aperture of the secondary chamber 24.

In contrast with valves known from the state of the art, the membrane 25 of the main valve according to an embodiment lacks a calibrated aperture. The pilot line 28 allows for the supply of fluid (e.g., compressed air) into the pilot chamber 22. The pilot line may be connected to the aforementioned detection line 14. Respective sections of these lines 14 and 28 may be identical, which enables a greater simplicity in manufacturing as well as a reduction in costs. A main inlet line 18 may extend from the main supply line 208. A branch line 30 may connect the main inlet line 18 to the pilot line 28 and the detection line 14. The branch line 30 may extend generally parallel to the supply line 220. The pilot line 28 may be generally parallel with a provisional feed line 32. The provisional feed line 32 may extend from a first outlet of the distributor device 40 to the detection line 14.

The branch line 30 may be equipped with a restriction 34, such that the passage cross-section of the branch line is smaller at the restriction 34 than at portions before and after the restriction 34. The passage cross-section may be smaller than the passage cross-sections of the detection line 14 and/or the main inlet line 18. The passage cross-sectional size at the restriction 34 may be calibrated to a designated value or range. The provisional feed line 32 may provide a passage cross-section that is larger than the restriction 34, to increase pressure in the pilot chamber of the main valve during an initial phase, as described in more detail herein. The passage cross-section of the provisional feed line 32 may be smaller than that of inlet line 44 described here below, such as for cost reasons. The inlet line 44 may extend from the distributor device 40 to the secondary chamber of the main valve.

The distributor device 40 may include a distributor valve 41 mounted in a sliding fashion against a spring 43. The inlet of this distributor is formed by the downstream end of a connection line 42, which extends from the main inlet line 18. The cross-sectional passage size of the connection line 42 may be the same or similar to the cross-sectional passage size of the main inlet line 18. The outlet of the distributor 40 may be formed by an upstream end of a feed or inlet line 44 that supplies fluid to the secondary chamber 24 of the main valve 20 via the inlet aperture 21. The distributor device 40 may include a control line 54, which is described in more detail below. As a function of the fluid pressure in the control line, the distributor valve 41 may be able to achieve two operational positions. The distributor valve may ensure selective placement to fluidly connect the connection line 42 with either the provisional feed (e.g., secondary) line 32 or the inlet line 44 of the secondary chamber 24.

The inlet line 44 may have a cross-sectional passage size (e.g., diameter) that is considerably larger than that of the provisional feed line 32. In an embodiment, the lines 220, 18, 42, and 44 have relatively large cross-sectional passage sizes because these lines define a pathway to exhaust fluid from the expansible device and the large passageway allows rapid evacuation of the fluid (e.g., air) out of the expansible device when triggered, as described herein. The secondary chamber 24 of the main valve 20 may have an outlet aperture 50, which has a cross-sectional size that is larger or equal to that that of the lines 220, 18, 42, and 44.

The distributor device 40 includes at least one distributor valve. In the illustrated embodiment, the distributor device includes a main distributor valve 41 and an intermediate distributor valve 52. The main distributor valve 41 may be controlled by the intermediate distributor valve 52, via the aforementioned control line 54 which extends from the intermediate distributor valve to the main distributor valve. The intermediate distributor valve may include a valve member 53 mounted in a sliding fashion against a spring 55. Traditionally, as a function of the position of this valve member 53, an inlet line 57 of the intermediate distributor valve 52 is selectively fluidly connected with one of the outlets of the intermediate distributor valve 52. The inlet line 57 is fluidly connected to the connection line 42 (e.g., which extends from the main inlet line 18 and main supply line 208). The outlets of the intermediate distributor valve 52 include the control line 54 which extends to the main distributor valve 41 and controls the actuation position of the main valve 41. A second outlet of the intermediate distributor valve 52 may be blocked off by a plug 59. The intermediate distributor valve 52 may be connected, via a control line 56, to a reserve chamber 60. The reserve chamber may be supplied fluid from a reserve line 62 that is fluidly connected to the connection line 42. The reserve line 62 may be equipped with a restriction 64 that has a smaller cross-sectional passage size than that of the connection line 42.

When a pressure in the control line 56, is less than a first threshold value, noted as P1, the intermediate distributor valve 52 is in the position or configuration shown in FIG. 2. For example, the valve 52 fluidly connects the control line 56 to the outlet that has the plug 59. The control line 56 is blocked off from the outlet control line 54 that connects to the main distributor valve 41. Then, when the control pressure becomes greater than this first value P1, the intermediate distributor valve 52 automatically switches to the position or configuration shown in FIG. 3. In FIG. 3, the control line 56 is fluidly connected, via the valve 52, to the outlet control line 54 and the main distributor valve 41. The control line 56 is blocked off from the outlet that has the plug 59. Moreover, when the control pressure drops once again, the intermediate distributor valve 52 may not switch back to the first operational position shown in FIG. 2 until the control pressure drops below a second threshold value P2, which is less than the first valve P1. The second value P2 may be slightly less than the first value P1, to avoid unintentional oscillation of the intermediate distributor valve 52.

The intermediate distributor valve 52 may be adjustable, as embodied by the arrow associated with spring 55. For example, the distributor valve may be a pneumatic manostat type of valve. The valve may have an adjustment knob that is manually actuatable to set and modify the two aforementioned threshold pressure values, allowing for control of the distributor 52. Hysteresis, the difference in value between P1 and P2, may be generally set and not adjustable. Optionally, two pneumatic manostats may be combines to enable independent modification of these threshold values. In an embodiment, the main distributor valve 41 is not adjustable. For example, the main distributor valve 41 may not be a pneumatic manostat type of valve. In an embodiment, the main distributor valve 41 and the intermediate distributor valve 52 are distributor valve types. In an alternative embodiment, at least one of the distributor valves may be another types of distributor, such as a poppet valve.

In a specific embodiment which constitutes a non-limiting example, the cross-sectional passage sizes of the lines 18, 42 and 44 may be between 8 mm (millimeters) and 15 mm, such as about 10 mm. The cross-sectional passage size of the line 32 may be between 4 mm and 6 mm, such as about 4 mm. The cross-sectional passage size of the restriction 34 may be between 0.4 mm and 1.2 mm, such as about 0.7 mm. The cross-sectional passage size of the restriction 64 may be between 0.2 mm and 0.7 mm, such as about 0.4 mm. The cross-sectional passage size of the lines 14 and 28 may be between 4 mm and 6 mm, such as about 4 mm. The volume of the reserve chamber 60 may be between 0.2 L (liters) and 1.0 L, such as about 0.4 L.

In FIGS. 2 and 3, the lines in which compressed air (or other pressurized fluid) circulates are shown in dotted lines. The other lines are illustrated in solid lines. The flow direction of compressed air is shown by arrows.

As the fluid supply unit 206 delivers compressed air, a first portion of the compressed air flows along the feed line 220 to the expansible device 218 and another portion of the compressed air flows along the main inlet line 18. The compressed air from the main inlet line 18 accumulates in the reserve chamber 60 and in the control line 56. With the intermediate distributor valve 52 in the first operable position shown in FIG. 2 (e.g., closed position), the plug 59 blocks flow of the air, so the air pressure progressively increases in the control line 56. At first, the compressed air pressure is lesser than the first threshold value P1. As a consequence, the inlet line 57 is blocked by the plug 59. The outlet control line 54 is not supplied with compressed air, so the main distributor valve 41 of the distributor device 40 is kept in the position shown in FIG. 2. In this configuration, the compressed air is solely admitted in the pilot chamber 22 of the main valve 20. The distributor device 40 is in its first operational position, called the temporary shut out position. In the temporary shut out position, the distributor device 40 blocks air supply to the inlet line 44 feeding the secondary chamber 24 of the main valve 20. This phase of temporary shut out also corresponds to a provisional phase. During the provisional phase, compressed air is supplied through the provisional feed line 32 to the pilot chamber 22 of the main valve 20.

This configuration represents a first phase of raising of the pantograph. The pilot chamber 22 of the main valve 20 is quickly filled with compressed air from the provisional feed (e.g., secondary) line 32. In at least some known pre-existing positioning systems, the pilot chamber is slowly filled through a small-diameter calibrated hole through the membrane. In an embodiment, the provisional feed line 32 may have a diameter that is quite a bit larger than that of a calibrated hole through the membrane, which allows faster filling of the pilot chamber. Furthermore, the membrane 25 may not have any holes, which restricts leak paths. The membrane 25 blocks off the secondary chamber 24.

During this first stage, the pressure in the pilot chamber 22 is greater than in the secondary chamber 24. The pressure differential firmly pins the membrane 25 against the seat 29, which is shown by arrow F25 in FIG. 2. The secondary chamber 24 is not fed fluid during this time period, so the fluid feeding the expansible device cannot escape or leak through the valve 20. The pantograph may rise in a reliable manner, shown by arrow F216 in FIG. 2, because the expansible device is supplied compressed air at a sufficient pressure for an extended duration.

The first phase of initial raising may end when the articulated arm reaches a deployed position. In the deployed position, the contact (e.g., rub) strips 10 and 12 may physically contact the overhead line. FIG. 3 shows the deployed position. With the arm in the deployed position, the air pressure in the control line 56 may continue to increase until the air pressure exceeds the first threshold value P1. In response, the valve member 53 of the intermediate distributor valve 52 may move to fluidly connect the inlet line 57 to the outlet control line 54. The compressed air within the outlet control line 54 may, in turn, displace the main distributor valve 41 of the distributor device 40. The main distributor valve may be moved to a second operational position, called a supply position, in which the main distributor valve allows the supply of compressed air along the inlet line 44 to the secondary chamber 24 of the main valve 20.

At this time, the secondary chamber 24 of the main valve 20 is supplied compressed air from the inlet line 44 connected to the distributor device 40, and the pilot chamber 22 of the main valve 20 is supplied compressed air from the branch line 30. The branch line 30 includes the restriction 34, so the flow rate of the compressed air to the pilot chamber 22 may be less than the flow rate to the secondary chamber 24. The branch line 30 may compensate for possible minor leakages of the circuit for surveillance of wear of the strips. For example, the branch line 30 may supply compressed air to the tubes 11 and 13, pilot chamber 22 of the main valve 20, and the associated lines, even if there are minor leakages in the detection circuit.

In known systems that use a membrane with a calibrated hole, the diameter of the calibrated hole may be the result of a compromise between the speed of filling and the detection sensitivity of a leakage of tube 11 or 13, due to wear of strip 10 or 12. A larger diameter hole may enable rapid filling of the detection circuit, thereby ensuring the raising of the pantograph. This efficient raising, however, is accompanied by a substantial loss in detection sensitivity, which is undesirable. In contrast, an overly small diameter does not allow for a sufficiently fast filling of the pilot chamber, which will therefore not be able to oppose the force brought about by the pressure in the secondary chamber, making the raising of the pantograph impossible.

One or more embodiments of the inventive subject matter provide a decoupling between the filling of the detection circuit along the provisional feed line 32 and the compensation for possible minor leakages that is provided by the branch line 30 with the restriction 34. As a consequence, the diameter of the restriction 34 can advantageously be smaller than that of the calibrated hole of the membrane provided in prior art, which may offer better detection sensitivity of wear of the strips.

The pilot chamber 22 may be filled with the pressurized fluid prior to the secondary chamber 24. The membrane 25 may have a surface, facing the pilot chamber, that is larger than that facing the secondary chamber. The force applied on the membrane 25 by the fluid in the pilot chamber may always be greater than (or the same as) that the which is applied on the membrane in the secondary chamber, corresponding to the aforementioned arrow F25 in FIG. 2. As a result, the firm pinning of the membrane against the seat 29 may maintain the outlet aperture 50 of the secondary chamber in a constantly closed state. During the complete raising of the pantograph, there may be substantially no leaks at the outlet aperture 50.

The intermediate distributor valve 52 may allow for temporal shifting of the passage of the distributor device 40, from the shut out position towards a supply position, in response to occurrence of a supply triggering event. The supply triggering event may be representative of a deployment of the pantograph. In the illustrated example, this event corresponds to the moment in which the supply unit 206 starts to supply pressurized fluid. As a variant, this event can correspond to the moment in which the pantograph leaves a low position. For example, a cam fitted on the articulation arm may control the distributor device 40 to achieve the supply position, when the pantograph reaches a height that is determined by the cam. In this case, the distributor device 40 may have mechanical control instead of pneumatic control. The auxiliary, intermediate distributor valve 52, reserve chamber 60, and the associated lines may be optional if the distributor device 40 has mechanical control.

In the case of one of the contact strips 10 and 12 experiencing critical wear, the tube inserted in the contact strip may be pierced and thereby brought to atmospheric pressure. For example, the strip 10 shown by arrow F10 in FIG. 4 may experience critical wear, such that pressurized fluid within the tube 11 leaks out through one or more wear openings. This leakage may be a greater flow rate than is supplied by the branch line 30 equipped with the restriction 34. As a result, the pilot chamber 22 of the main valve 20 is substantially no longer fed compressed air. The pressure of the secondary chamber 24 then exercises a greater force on the membrane 25 than that of the pilot chamber onto the membrane. The pressure differential causes the membrane 25 to rise according to arrow F25 in FIG. 4, such that the membrane 25 lifts off the seat 29. The displacement of the membrane 25 allows compressed air to evacuate through the aperture 50 of the valve 20, as shown by arrow F50. The pressure in the expansible device 218 may be reduced to atmospheric pressure, which is shown by arrow F218. The pressure reduction may cause the articulated arm 216 to descend, in the direction of the arrow F'216 in FIG. 4.

Concurrently, the air may evacuate from the reserve chamber 60. Due to the restriction 64, however, the evacuation from the reserve chamber 60 may occur at a low flow rate (significantly lower than the flow rate that the air exits the aperture 50 of the main valve 20). The pressure in the control line 56 may diminish slowly. In these conditions, the pressure in the control line 56 may decrease relatively slowly, so there is a delay before the pressure drops below the second threshold value P2. As a result, the intermediate distributor valve 52 may not immediately return to the initial configuration shown in FIG. 2, and the main distributor valve 41 may not immediately return to the shut out configuration. Stated differently, there may be a temporal shift between a triggering event representative of the retraction of the pantograph and the return of the distributor device to the shut out configuration. In the illustrated example, this triggering event corresponds to the contact strip being pierced to form a leak path into the external environment. In an alternative embodiment, the triggering event may correspond to a moment in which the pantograph returns to a designated position, such a lowermost position. For example, a cam fitted on the articulated arm may control the distributor device 40 to achieve the shut out position when the pantograph returns below a height determined by the cam. In this case, the distributor device 40 is mechanically controlled instead of pneumatically controlled.

Once the pressure in reserve chamber 60 and in the control line 56 have substantially diminished, the intermediate distributor valve 52 may automatically return to the initial configuration shown in FIG. 2. As a consequence, the main distributor valve 41 may switch to the initial shut out configuration. This switching may occur following a major evacuation of air from the expansible device, provoking a descent of the pantograph to the retracted (or lowered) position. In an embodiment, after the positioning system lowers the pantograph, the articulated arm may not be permitted to raise the pantograph to the deployed position until maintenance is performed on the contact strip(s). For example, since the strips 10 and 12 are still at atmospheric pressure with a leak path formed in the detection circuit, the pressure within the expansible device cannot increase above atmospheric pressure until the contact strip(s) are fixed. Under these conditions, this expansible device cannot deploy the arm, as indicated by the crossed-out arrow F''216 in FIG. 5. This lock-out feature may be advantageous for preventing the current-collector bow, equipped with the defective contact strip(s), from extending into physical contact with the power supply line. The positioning system may avoid risk of the current-collector bow snagging with the overhead power supply line and/or causing deterioration of the power supply line.

FIGS. 6 through 8 illustrate three embodiments of the inventive subject matter. In FIGS. 6 through 8, mechanical elements that are identical to those in FIG. 1 through FIG. 5 have the same reference numbers, with only the different mechanical elements being assigned a suffix "first" ('), "second" (") and "third" (''').

Positioning system 1' of FIG. 6 differs from that of the preceding embodiments because the positioning system 1' lacks the branch line 30 equipped with the restriction 34. Furthermore, in contrast with positioning system 1 of FIGS. 1 through 5, the membrane 25' of the valve 20' is pierced by an aperture 27'. For example, the cross-sectional size of the aperture 27' may measure between 0.7 mm and 1.2 mm.

The implementation of the pantograph positioning system 1' according to the embodiment of FIG. 6 may be analogous to that of the previously described embodiment. The embodiment of FIG. 6 may be less preferable than the embodiment of FIGS. 1 through 5.

During the implementation of positioning system according to the embodiments described herein, the distributor device and the main valve may be mounted on a pneumatic plate. The pneumatic plate may be in the form of a metallic block in which are implemented, using all appropriate means, the lines 18, 28, 30, 32, 42, 44, 54, 56, 57, 62, the restrictions 34, 64, and the reserve chamber 60. The pneumatic plate may enhance the reliability of the system. For example, the plate may reduce the risk of leaks by limiting the number of coupling interfaces between discrete elements. The plate may also allow for a cost reduction of the positioning system. Furthermore, the use of a main valve according to the first embodiment shown in FIGS. 1 through 5, without a membrane pierced by a calibrated hole, may contribute to greater reliability at a reduced price. However, this embodiment in FIG. 6 allows for refurbishment or retrofitting of an existing pantograph rapid descent device with the main valve 20' that includes the calibrated hole through the membrane.

Positioning system 1'' of FIG. 7 differs from that of the preceding embodiments because the system lacks the reserve chamber 60, the control line 56, and the intermediate distributor valve 52 of the first embodiment. The system in FIG. 7 includes a retarder 60'' of any appropriate type, which is operably coupled to the distributor device 40. During operation, the pantograph may be raised, as described above, when the distributor device 40 is in an active position, analogous to that of FIG. 2. The retarder 60'' may cause the distributor device to switch to an inactive position at the end of a designated time period. The time period may be between 6 and 10 seconds, according to a non-limiting example. If one of the contact strips is pierced to form a leak path with the atmosphere, the retarder 60'' may temporarily shift the distributor device back to the active position. A period of time between 6 and 10 seconds may be observed from the moment of exposure to the atmosphere before the distributor device is switched to its active position.

The retarder 60'' may be of a mechanical type, such as, for example, a cam that is mounted on the articulated arm between the lower arm and the chassis 212. The cam may control the distributor device 40'' to achieve a supply position when the pantograph reaches a determined height by the cam, and a shut out position when the pantograph returns below a height determined by the cam. The distributor device 40'' may be mechanically controlled instead of pneumatically controlled. Even if the cam determines a pantograph height, this height may correspond to a determined temporal shift because the fluid supply unit may be equipped with a flow rate regulator.

In an alternative embodiment, aspects of the embodiments of FIG. 6 and FIG. 7 may be combined. In other words, the membrane may be pierced by an aperture like the aperture 27' in FIG. 6, and the positioning system may be equipped with a retarder like the retarder 60'' in FIG. 7.

In an embodiment shown in FIG. 8, the two distributor valves 40 and 52 are advantageously replaced by a single distributor device 40'''. This embodiment, which may be cost effective, may be implemented when the pilot pressure is known. The embodiment of FIG. 8 may be particularly applicable to large-scale industrialization, in particular, when the implemented with the aforementioned pneumatic plate.

The pantograph positioning system, according to the embodiments described herein, may be installed on an original equipment pantograph. As an alternative, the positioning system may be installed on an existing pantograph, such as a pantograph that lacks a rapid descent device or a pantograph equipped with a used, known type of rapid descent device. In the latter case, the positioning system described herein would replace the used rapid descent device.

The temporary shut out phase of the distributor device 40 may be concurrent with the provisional feeding phase, by line 32. As an alternative example, there may be a shift between the temporary shut out and the provisional feeding. For example, the start of the provisional feeding phase can be shifted in time according to designated time period, in relation to the start of the temporary shut out phase.

In the aforementioned embodiments, the main valve 20 that has the membrane 25 free of an aperture, may be combined with means of temporary shut out of the supply of fluid to the secondary chamber. However, as an alternative embodiment, that same valve 20 may be implemented in a rapid descent device which does not have such temporary shut out means.

In one or more embodiments, the pantograph positioning system includes a manifold that is connected to a distributor device, a main valve, and an expansible device. The manifold routes a fluid, such as air, through the distributor device, the main valve, and the expansible device. In response to a leak event, an outlet aperture opens in the main valve. Fluid within the expansible device is permitted to flow through the manifold and escape into the surrounding environment through the outlet aperture. The escape of fluid from the expansible device allows the pantograph to drop relatively quickly. The positioning system described herein may enable a pantograph to drop at speeds of at least 20 cm per second, such as speeds of 30 cm per second or over 30 cm per second.

In an embodiment, the manifold of the positioning system may be formed as a unitary structure formed from a single piece or body, such that the manifold has a monolithic body. For example, the manifold may be formed as a homogenous single component, rather than a non-homogenous component or a component formed by two or more separate bodies that are then combined with each other. The homogenous component may have the same consistency and/or chemical makeup throughout the entirety or substantially all of the component.

The monolithic body of the manifold may be formed via an additive manufacturing process. The monolithic body may be defined by layers of material that are stacked and fused together. The layers may be sequentially deposited at least partially on top of each other in a build direction, with each layer fusing to the layer below. The aggregate fused layers of the body eventually form a designated structure according to a computer design file. The additive manufacturing can be performed by a three-dimensional printing system, according to instructions in the design file, to produce the monolithic body of the manifold according to the embodiments described herein.

The manifold may include various components that are integral components of the monolithic body. The components include a housing, a supply pipe, a pantograph pipe, and a valve pipe. For example, the housing, the supply pipe, the pantograph pipe, and the valve pipe may be formed together during a single additive manufacturing process. The supply pipe, pantograph pipe, and valve pipe are seamlessly connected to the housing.

The manifold of the positioning system according to the embodiments described herein has several advantages. First, integrating multiple components into a monolithic body of the manifold limits the number of potential leak paths. For example, the housing is seamlessly connected to the supply pipe, rather than coupling the supply pipe to the housing with a gasket, so there is very low risk of a leak forming at an interface between the housing and the supply pipe, even after years of operation. A secondary benefit of integrating multiple components into the monolithic body is a reduction in individual parts used to assemble the positioning system, which may reduce part costs, reduce assembly costs, and may also increase manufacturing efficiency. Another benefit of the manifold described herein is that the manifold has a relatively compact size and is lightweight, without sacrificing performance. The layout of components and flow channels through the manifold is designed to provide enhanced pantograph auto-drop performance in a compact, lightweight form factor. Other benefits of the positioning system are described herein with reference to the associated figures.

Figure 9:
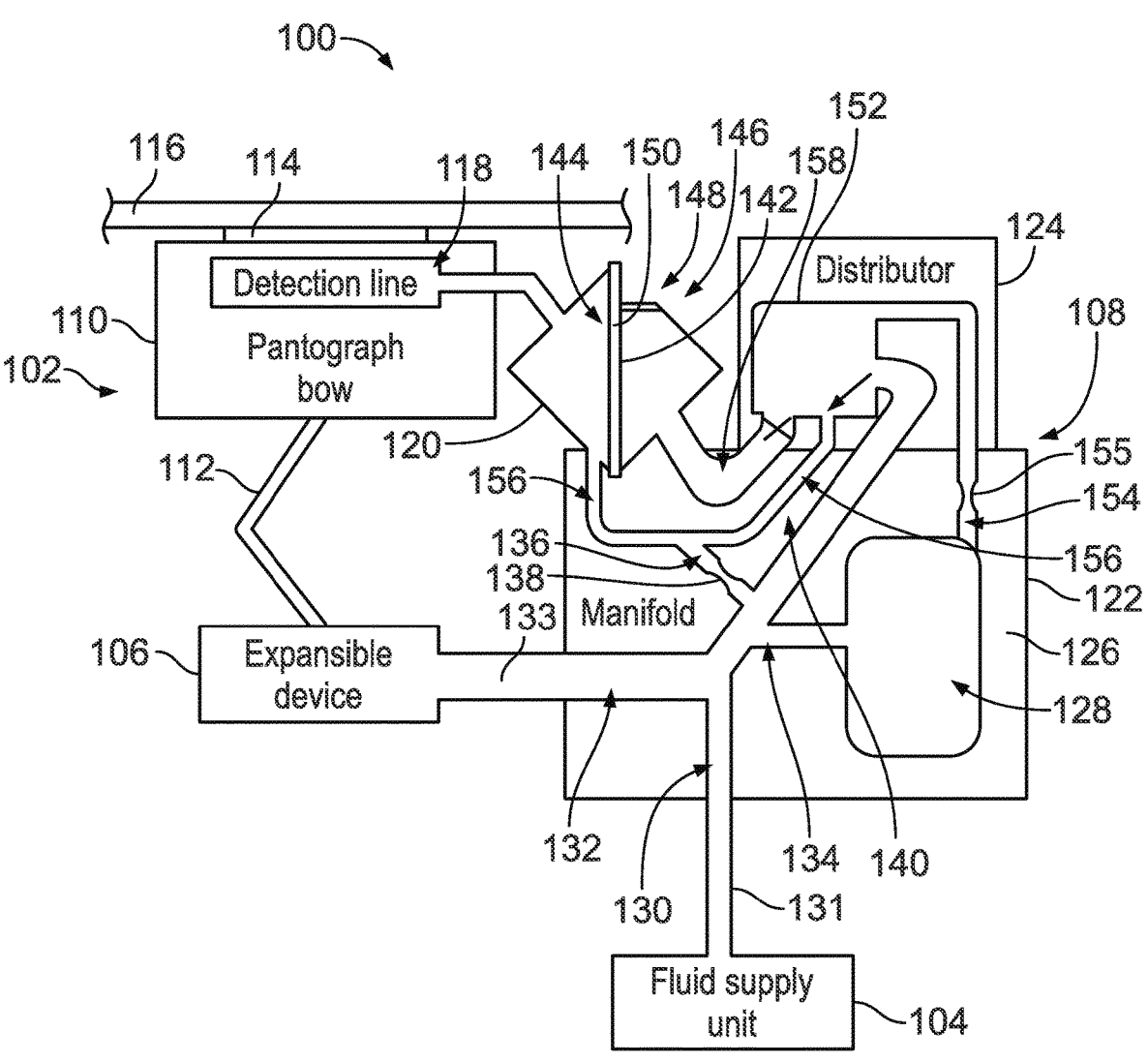
FIG. 9 is a schematic diagram of a power transfer system according to an embodiment.

FIG. 9 is a schematic diagram of a power transfer system 100 according to an embodiment. The power transfer system may be installed onboard a vehicle. The vehicle may be a rail vehicle (e.g., a locomotive, light rail car, etc.), a bus, a truck, an automobile, or the like. The power transfer system can be used to supply power to the vehicle for propelling movement of the vehicle. For example, the power transfer system may transfer electrical power from an off-board entity to the vehicle for powering the vehicle. The vehicle may be an electric vehicle in which movement of the vehicle is entirely powered by electrical energy conveyed to at least one motor. Alternatively, the vehicle may be a hybrid vehicle that uses electrical energy and another power source, such as an internal combustion engine, to power movement of the vehicle. Optionally, the power transfer system can be used to transfer electrical power in the opposite direction, from the vehicle to the off-board entity. The off-board entity may be a power grid or network, an electrical storage device, another vehicle, or the like. The vehicle may be the vehicle 200 partially depicted in FIG. 2.

The power transfer system may include a pantograph 102, a fluid supply unit 104, an expansible device 106, and a positioning system 108. The pantograph may be the pantograph 210 shown in FIG. 2. The pantograph may include a bow 110 and an articulated arm 112. The bow includes one or more conductive elements 114, referred to as collector shoes. The collector shoe(s) may physically contact an electrified element to establish an electrically conductive path between the power transfer system and the off-board entity. The collector shoe(s) may be contact strips (e.g., rub strips) that are designed to rub and slide against the electrified element as the vehicle moves relative to the electrified element. In the illustrated embodiment, the electrified element is a catenary line 116. The catenary line may be disposed above (e.g., overhead) the pantograph. For example, the pantograph may be mounted on a roof of the vehicle, and the articulated arm suspends the bow a height above the roof to physically contact the catenary line.

The expansible device 106 is mechanically connected to the articulated arm of the pantograph, and controls the extension of the pantograph. The expansible device may be the expansible device 218 shown in FIG. 1. The expansible device may be a pneumatic device that receives a compressed fluid, such as compressed air or another gas. The expansible device may expand and contract based on the pressure of the fluid within the expansible device. The expansible device may be a cushion, a bellows, or the like. When the expansible device expands, the expansible device forces the articulated arm to extend, pushing the bow farther away from the expansible device. When the expansible device contracts, the bow and articulated arm retract towards the expansible device.

The pantograph bow may include a detection line 118 or circuit that is integrated with the one or more collector shoes. The detection line is a pneumatic flow path that connects to a main valve 120 of the positioning system. The detection line may represent a portion of the positioning system that is integrated into the pantograph bow. The detection line may be used to determine when the bow, or at least one of the collector shoes thereon, is damaged or excessively worn. For example, damage or excessive wear of a collector shoe (contact strip) may form a hole that fluidly connects the detection line to the external (ambient) environment. The fluid within the detection line may leak through the hole, resulting in a pressure drop at the valve. The pressure drop in the detection line triggers the positioning system to quickly retract (e.g., lower) the pantograph. The positioning system may automatically drop the pantograph bow out of an elevated position in contact with the overhead catenary line. When the pantograph retracts, the one or more collector shoes (contact strips) separate from the catenary line. With the pantograph retracted, there is no electrically conductive path between the power transfer system and the off-board entity.

The positioning system may include the main valve 120, a manifold 122, and a distributor device 124 (also referred to herein as distributor). The manifold is fluidly connected to each of the expansible device, the fluid supply unit, the distributor, and the main valve. The manifold includes a housing 126 which may define a chamber 128 (e.g., a reserve chamber or tank). The manifold includes a set of flow channels that are designed to convey the fluid (e.g., compressed air or other gas) between the different components to accomplish extending and retracting the pantograph, as described herein. The flow channels extend through the housing.

The flow channels of the manifold may include a supply line 130 that is fluidly connected to the fluid supply unit 104. The fluid supply unit is a source of compressed fluid. The compressed fluid may be compressed air. The fluid supply unit may be disposed onboard the vehicle, remote from the positioning system. The fluid supply unit may be an air compressor, a tank that contains compressed fluid, or the like. The manifold may be connected to the fluid supply unit by at least a first hollow member 131. The first hollow member(s) may include a hose, a tube, a pipe, or the like, which provides a fluid pathway.

The flow channels may include a first branch or feeder line 132 that branches off the supply line. The first branch line may be connected to the expansible device. For example, some of the compressed fluid that is supplied to the manifold from the fluid supply unit may be directed along the first branch line to the expansible device. The compressed air that is received in the expansible device may serve to expand the expansible device, causing the articulated arm to life or extend the bow. The first branch line is referred to as a pantograph line. The manifold may be connected to the expansible device by at least a second hollow member 133. The second hollow member(s) may include a hose, a tube, a pipe, or the like, which provides a fluid pathway.

The flow channels may include a second branch line 134 that branches off the supply line and connects to the chamber of the manifold. Compressed fluid that is conveyed through the second branch line may at least partially fill the chamber. The second branch line is referred to as a chamber line 134. A third branch line 136 may branch off the supply line to supply compressed fluid to the main valve. The third branch line is referred to as a valve line 136. The valve line may include a restriction 138. The restriction represents a narrow section of the valve line that has a smaller cross-sectional area than other sections of the valve line and other flow channels through the manifold. The restriction may limit the amount (e.g., flow rate) of compressed fluid that is conveyed through the valve line. In an embodiment, the valve line may consistently supply compressed fluid, at a relatively small flow rate, to a pilot chamber of the main valve, regardless of the actuated position of the distributor valve(s). The supply line may proceed along a fourth segment 140 and connect to the distributor. The fourth segment supplies compressed fluid to the distributor, and is referred to as a distributor line 140.

The main valve is actuatable to control flow of the compressed fluid through the manifold and between the components of the pantograph positioning system. In an embodiment, the main valve includes two chambers and a membrane 142 that separates the two chambers. The two chambers include a pilot (or primary) chamber 144 and a secondary chamber 146. The valve includes an outlet aperture 148. The outlet aperture is an opening that is defined along the secondary chamber. The membrane is movable between a closed position and an open position. The membrane is in the closed position in FIG. 9. In the closed position, the membrane blocks the outlet aperture. In the open position, the membrane does not block the outlet aperture, allowing compressed fluid to exit the secondary chamber of the main valve into the external environment. In the closed position, the membrane abuts against an edge member 150 of the outlet aperture, sealing the outlet. In the open position, the membrane is dislodged and spaced apart from the edge member, enabling a leak path between the membrane and the edge member.

The distributor is a device that includes one or more distributor valves 152. The manifold may define a control line 154 that extends from the chamber of the manifold to the one or more distributor valves. The control line may include a restriction 155 to limit the flow of compressed fluid through the control line 154. The pressure within the control line may control a distribution setting or position of the distributor valve(s). For example, when the pressure within the control line is below a first threshold pressure value, the one or more distributor valves are set in a first distribution position. In the first distribution position, the distributor directs compressed fluid from the distributor line of the manifold to the pilot chamber of the main valve and blocks compressed fluid from entering the secondary chamber of the main valve. As shown in FIG. 9, a pilot inlet line 156 extends from the distributor to the manifold, and through the manifold to the pilot chamber of the main valve. A secondary inlet line 158 extends from the distributor to the manifold, and through the manifold to the secondary chamber of the main valve. In an example application, the first threshold pressure value may be 2.5 bar.

In the first distribution position, the pilot inlet line is open and fluidly connected to the distributor line of the manifold. Compressed fluid from the fluid supply unit is conveyed, through the manifold and the distributor, into the pilot chamber. Some of the compressed fluid received in the pilot chamber flows into the detection line on the pantograph bow. The secondary inlet line is closed or blocked, so no compressed fluid is supplied into the secondary chamber of the valve. At this stage, the pressure within the pilot chamber exceeds the pressure within the secondary chamber, and the pressure differential forces the membrane to remain in the closed position. For example, the greater pressure in the pilot chamber forces the membrane against the edge member of the secondary chamber, sealing the outlet aperture. The first distribution position may be referred to as a shut out position, because the secondary chamber of the main valve is blocked off by the membrane in the seated position. The compressed fluid supplied to the expansible device, while the distributor is in the shut out position, may cause the expansible device to raise the pantograph towards the overhead line.

In an embodiment, once the pressure within the control line meets or exceeds the first threshold pressure value, the one or more distributor valves of the distributor switch to a second distribution position. In the second distribution position, the secondary inlet line is open and fluidly connected to the distributor line of the manifold. The compressed fluid is directed into the secondary chamber of the main valve, which increases the fluid pressure within the secondary chamber. The pilot inlet line is closed or blocked, so no additional compressed fluid is supplied into the pilot chamber from the distributor. In the second distribution position, the pilot chamber of the main valve may continue to receive a small amount of compressed fluid through the valve line of the manifold, which includes the restriction. The pressure within the pilot chamber may be retained at a constant, or approximately constant, level. Because the pilot chamber is pressurized before the secondary chamber, and the secondary chamber does not receive higher pressure fluid than the pilot chamber, the membrane remains in the closed position seated against the edge member, blocking the outlet aperture. In the second distribution position, the expansible device may continue to receive compressed fluid, and may continue to raise the pantograph towards the overhead line. When the one or more collector shoes (contact strips) of the bow physically contact the overhead line, the pantograph achieves a deployed position. In the deployed position, the pantograph is connected to the overhead line by an electrically conductive connection.

Figure 10:
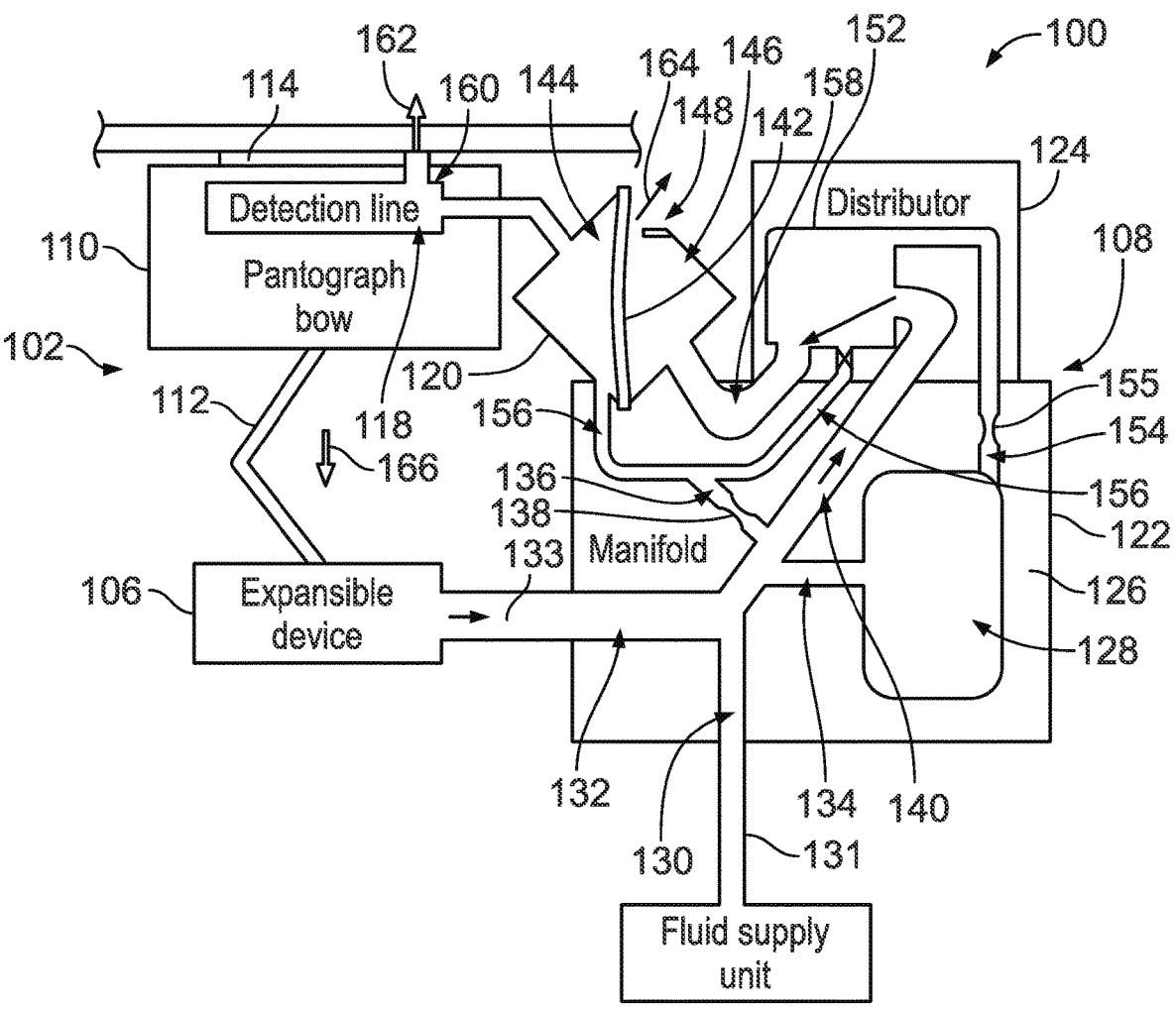
FIG. 10 is a schematic diagram of the power transfer system of FIG. 9, showing a leak condition according to an embodiment.

FIG. 10 is a schematic diagram of the power transfer system of FIG. 9, showing a leak condition according to an embodiment. If the bow experiences damage or excessive wear of at least one collector shoe, while the distributor is in the second distribution position, a portion of the detection line may be pierced, creating a leak path 160 to the external environment. The formation of the leak path is referred to as a leak event. A leak event allows the compressed fluid within the detection line to escape from the detection line, as represented by the arow 162. The compressed fluid within the detection line may be at a higher pressure than the atmospheric pressure of the external environment, so the compressed fluid diffuses in the direction indicated by the arrow. The pressure in the detection line decreases, which creates a pressure differential across the membrane in the main valve. For example, the pilot chamber is fluidly connected to the detection line. The secondary chamber is not fluidly connected to the detection line, so the pressure in the pilot chamber is less than in the secondary chamber. The membrane is forced out of the seated, closed position towards the lower-pressure pilot chamber. The membrane is dislodged by the pressure differential, which causes membrane to transition to the open position, opening the outlet aperture. The membrane is shown as curved or bowed in FIG. 10, due to the pressure differential. The compressed fluid is emitted from the outlet aperture of the secondary chamber, as represented by the arrow 164.

The opening of the outlet aperture represents a low pressure region within the flow circuit. The low pressure region draws compressed fluid from the expansible device into the manifold and the distributor, before entering the secondary chamber of the main valve. For example, the compressed fluid within the expansible device is directed through the manifold to the distributor. More specifically, the compressed fluid flows within the manifold along the pantograph line and the distributor line. The compressed fluid in the distributor is directed from the distributor back to the manifold within the secondary inlet line. The secondary inlet line feeds the compressed air to the secondary chamber of the main valve. The compressed fluid exits the main valve via the outlet aperture to flow into the external environment.

The expansible device may contract in response to the reduction in internal fluid pressure. The contraction of the expansible device causes retraction of the pantograph, in the direction indicated by arrow 166. For example, the contracting expansible device may pull the articulated arm towards a retracted position, or at least cease supporting the extension of the articulated arm, allowing gravity to lower the pantograph. The pantograph is located closer to the expansible device in the retracted position relative to in the deployed or extended position. The pantograph may drop relatively quickly in order to avoid exacerbation of the wear or damage to the pantograph. The flow channels of the manifold are designed to enable the pantograph to quickly drop in a controlled manner. For example, the fluid channels that form an escape path, through which the compressed flow travels from the expansible device to the secondary chamber of the main valve, may be constructed with relatively large cross-sectional areas to enable unobstructed fluid flow. The broad or large diameter fluid channels may include the first branch line (e.g., feeder line) 132 that connects to the expansible device, the distributor line 140, and the secondary inlet line 158 that connects to the secondary chamber of the main valve. These fluid channels may have larger diameters than other channels of the manifold that do not form the escape path for the compressed fluid, such as the valve line 136, the pilot inlet line 156, the chamber line 134, and the control line 154.

Figure 11:
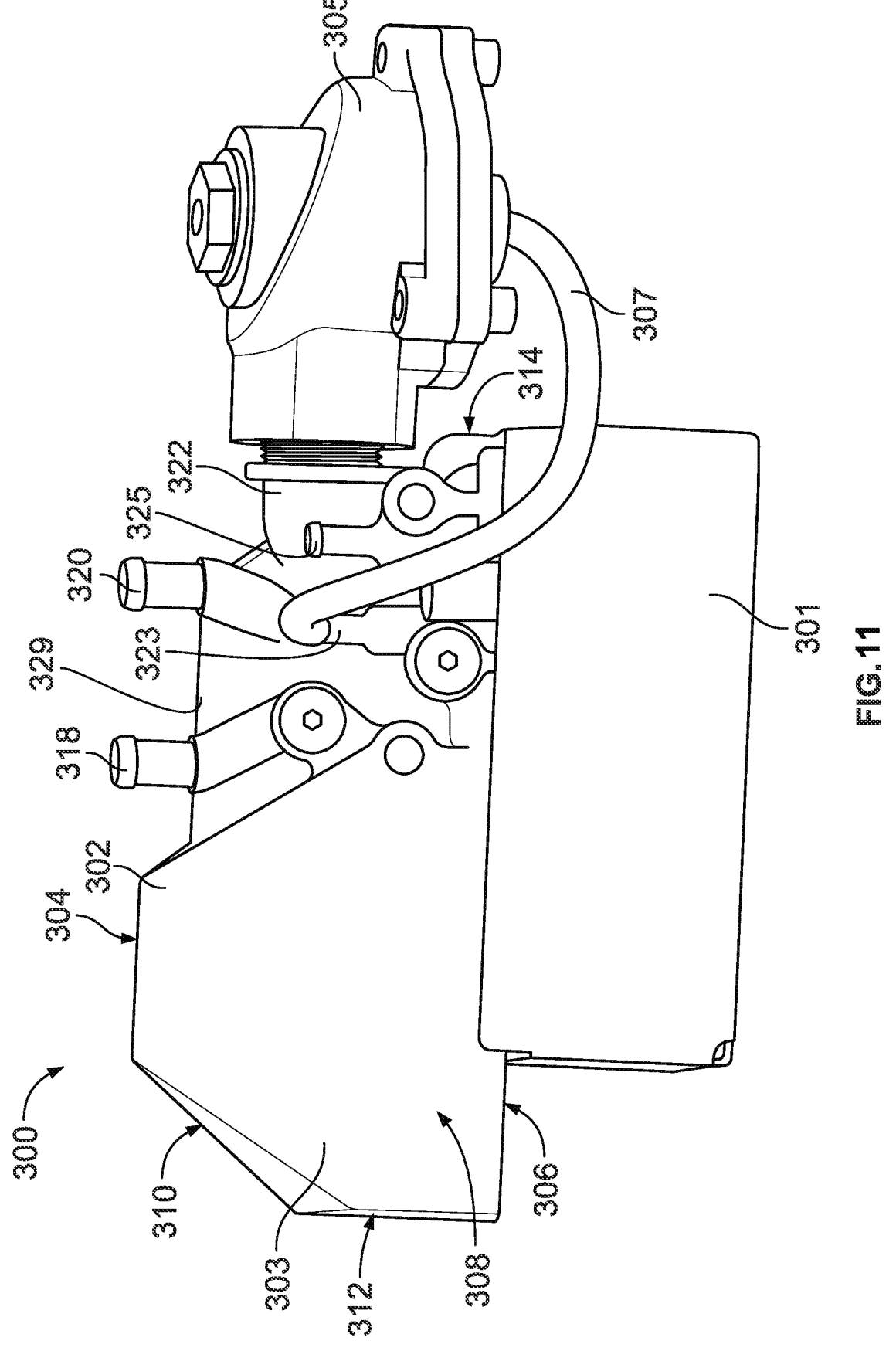
FIG. 11 is a perspective view of a pantograph positioning system according to an embodiment.

FIG. 11 is a perspective view of a pantograph positioning system 300 according to an embodiment. The pantograph positioning system may be the pantograph positioning system shown in FIGS. 9 and 10 and/or the pantograph positioning system shown in FIGS. 1 through 5. The pantograph positioning system includes a manifold 302, a distributor 301, and a main valve 305. The manifold includes a monolithic (e.g., unitary, one-piece) body 303. The body has a top end 304, a bottom end 306, a front end 308, a back end 310, a first lateral (e.g., left) end 312, and a second lateral (e.g., right) end 314. These spatial and directional terms are merely used with respect to the orientation shown in the FIG. 11, to provide a way to identify different components of the body relative to other components of the body. The manifold body can be inverted, rotated, or otherwise changed, such that the top end is a bottom end, and vice versa, left end becomes right end, and the like.

The distributor may be mounted to the manifold along the bottom end of the manifold. For example, an exterior surface 326 of the manifold (shown in FIGS. 14-16) at the bottom end may abut against the distributor. The main valve may be mounted to the manifold along the right end. In the illustrated embodiment, a hollow connection member 307 is coupled to both the manifold and the main valve. The hollow connection member may be a hose, pipe, tube, or the like. In the illustrated embodiment, the hollow connection member is discrete from the monolithic body of the manifold. For example, a first end of the hollow connection member is coupled to the manifold and a second end of the hollow connection member is coupled to the main valve to provide a flow path between the manifold and the main valve. In an embodiment, the hollow connection member provides the pilot inlet line 156 shown in FIGS. 9 and 10 which connects to the pilot chamber 144 of the main valve.

Figures 12, 16:
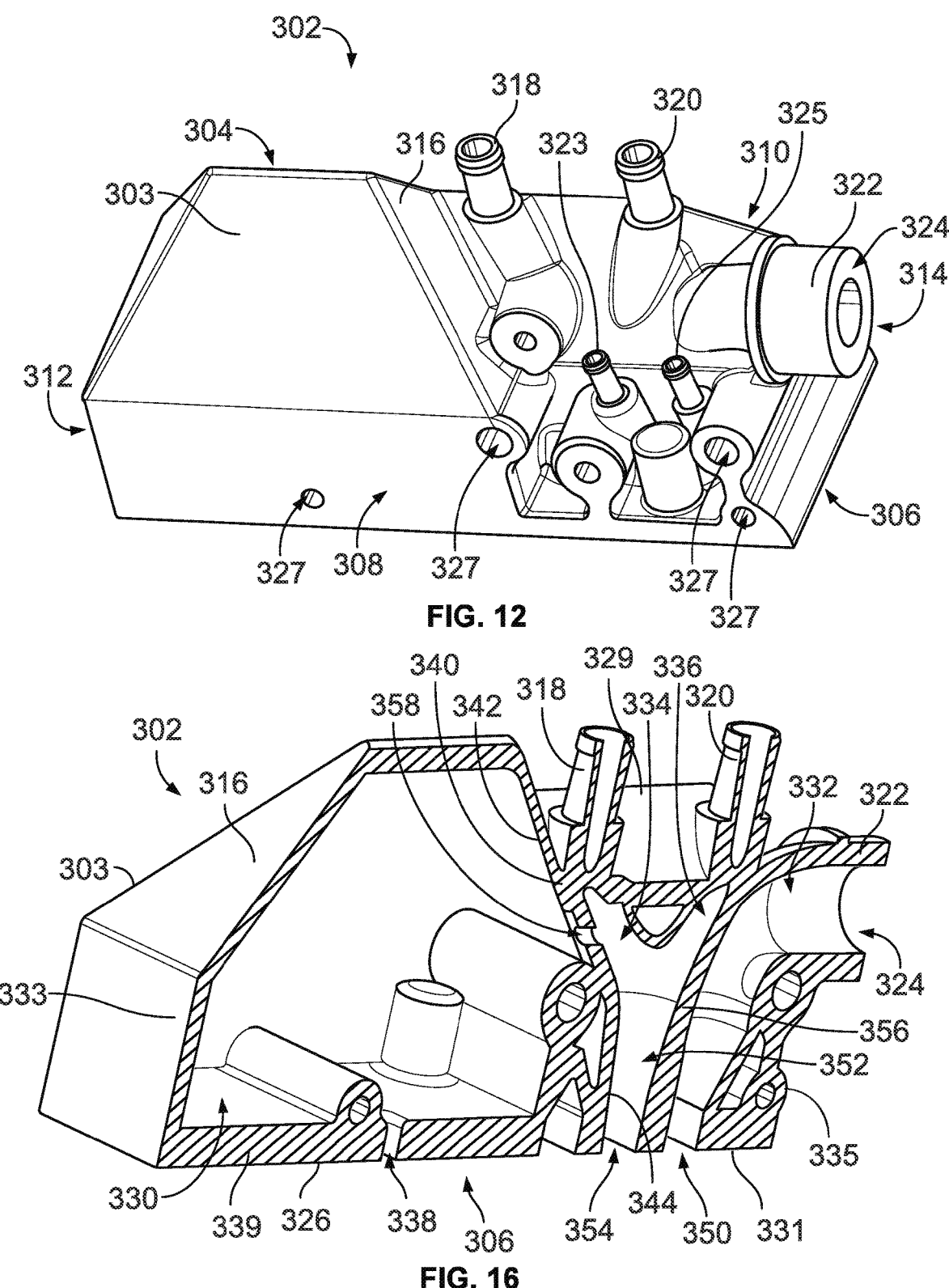
FIG. 12 is an isolated perspective view of a manifold of the pantograph positioning system shown in FIG. 11.
FIG. 16 is a cross-sectional view of the manifold shown in FIGS. 11 through 15.
Figure 13:
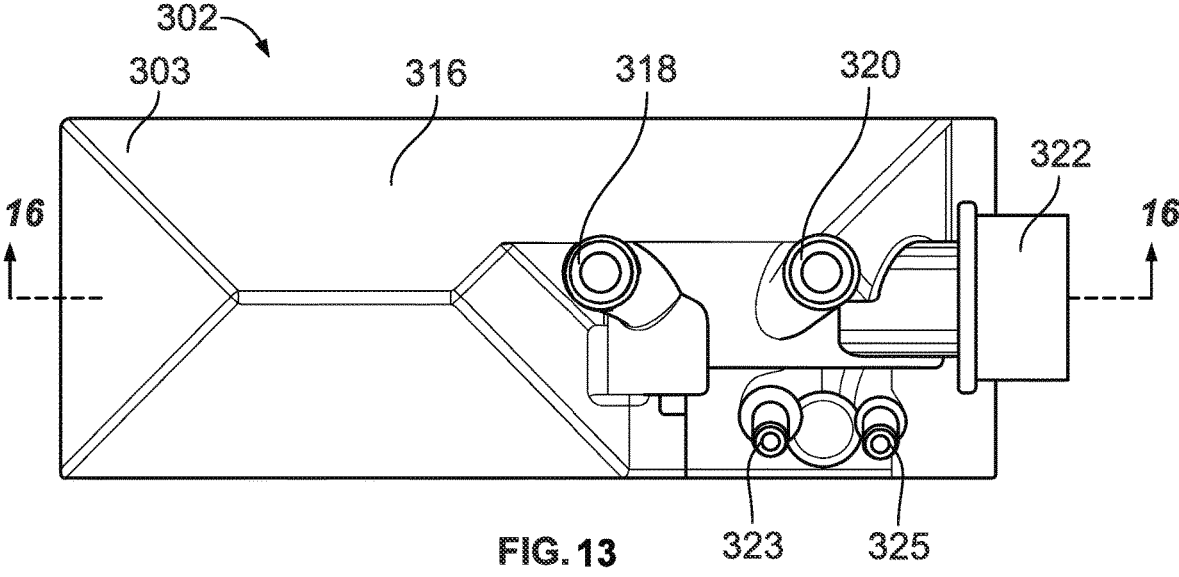
FIG. 13 is a top-down, plan view of the manifold shown in FIG. 11.
Figure 14:
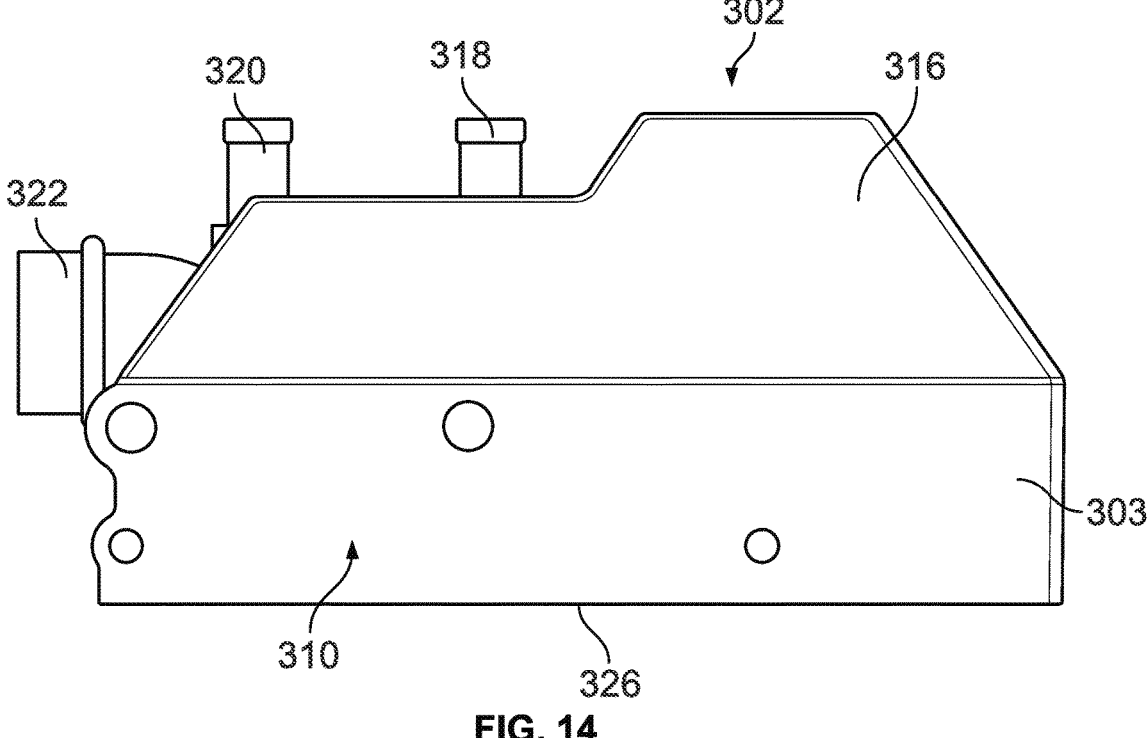
FIG. 14 shows a back end of the manifold of FIG. 11.
Figure 15:
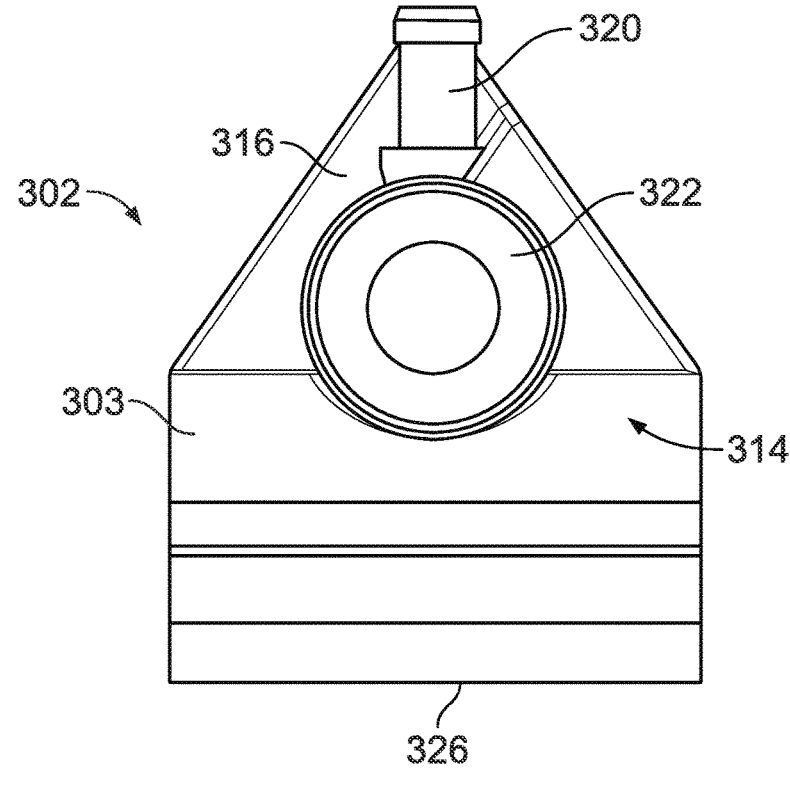
FIG. 15 shows a right end of the manifold of FIG. 11.

FIG. 12 is an isolated perspective view of the manifold of the pantograph positioning system shown in FIG. 11. FIG. 13 is a top-down, plan view of the manifold shown in FIG. 11. FIG. 14 shows the back end of the manifold of FIG. 11. FIG. 15 shows the right end of the manifold of FIG. 11. The following description refers to FIGS. 11 through 15.

The monolithic body of the manifold includes a housing 316, a supply pipe 318, a pantograph pipe 320, a valve pipe 322, and a pilot pipe 323. The supply pipe may connect to the fluid supply unit that supplies compressed fluid to the manifold. For example, the supply pipe may define at least a portion of the supply line 130 through the manifold shown in FIGS. 9 and 10. The supply pipe may couple to the first hollow member(s) that extend from the manifold to the fluid supply unit. For example, an end of a first hollow member may be fitted on the supply pipe or inserted into the supply pipe. In an embodiment, the supply pipe projects from the housing of the monolithic body.

The pantograph pipe may connect to the expansible device that is mechanically connected to the pantograph. For example, the pantograph pipe may define at least a portion of the pantograph line 132 through the manifold shown in FIGS. 9 and 10. The pantograph pipe may couple to the second hollow member(s) that extend from the pantograph pipe to the expansible device. Compressed fluid is conveyed from the manifold to the expansible device to expand the expansible device and deploy the pantograph. The compressed fluid may be conveyed in the opposite direction to quickly retract the pantograph in response to a leak event. In an embodiment, the pantograph pipe projects from the housing of the monolithic body. For example, the pantograph pipe and the supply pipe may extend generally upwards from a top side 329 of the housing.

The valve pipe may connect to the main valve. In an embodiment, the valve pipe projects from the housing of the monolithic body. The main valve may be mounted on a distal end 324 of the valve pipe (which is spaced apart from the housing). In an embodiment, the valve pipe may define at least a portion of the secondary inlet line 158 shown in FIGS. 9 and 10, which connects to the secondary chamber of the main valve. For example, the valve pipe may supply compressed fluid into the secondary chamber of the main valve. When a leak event occurs, compressed fluid from the expansible device may be received at the pantograph pipe and may flow through the manifold to the distributor. The manifold receives the compressed fluid back from the distributor, and the compressed fluid is directed through the valve pipe to the secondary chamber of the main valve, in which the compressed fluid is exhausted through the outlet aperture.

The pilot pipe of the manifold may connect to the pilot chamber of the main valve. For example, the hollow connection member 307 shown in FIG. 11 may mount to the pilot pipe to fluidly connect the manifold to the pilot chamber of the main valve. The pilot pipe may define a portion of the pilot inlet line 156 shown in FIGS. 9 and 10. The pilot pipe projects from the housing of the monolithic body in an embodiment.

Optionally, the manifold may include a sense pipe 325. The sense pipe may fluidly connect to one or more of the fluid channels within the manifold body to allow a sensor to monitor properties within the one of more channels. For example, a pressure sensor, flow sensor, temperature sensor, and/or the like may be mounted to the sense pipe to generate sensor data based on properties within the manifold channels. The sensor data may be used for calibration or the like. Optionally, the manifold may include one or more mounting holes 327 that are integrated into the monolithic body. The mounting holes may be positioned and sized to receive fasteners therein for mounting the manifold to a support structure. The support structure may be a portion of a vehicle.

The monolithic body of the manifold includes at least the housing, the supply pipe, the pantograph pipe, the valve pipe, and the pilot pipe integrated as a single, unitary structure. For example, the supply pipe, the pantograph pipe, the valve pipe, and the pilot pipe may each be seamlessly connected to the housing. These components may be formed together during a single manufacturing process. As a result, the monolithic body of the manifold is a homogenous single component, rather than a non-homogenous component or a component formed by two or more separate bodies that are then combined with each other. The monolithic body may have the same consistency and/or chemical makeup throughout the entirety or substantially all of the structure.

The monolithic body of the manifold may be formed via an additive manufacturing process (e.g., three-dimensional printing process). The monolithic body may be defined by layers of material that are stacked and fused together. The layers may be sequentially deposited at least partially on top of each other in a build direction, with each layer fusing to the layer below. The layers may be stacked on a build plate or platform of an additive manufacturing system. The aggregate fused layers of the body eventually form a designated structure for the manifold according to a computer design file. The additive manufacturing can be performed by a three-dimensional printing system, according to instructions in the design file, to produce the monolithic body of the manifold shown in FIGS. 11 through 15.

Suitable additive manufacturing processes may include, for example, laser powder bed fusion, electron beam powder bed fusion, directed energy deposition (DED), and binder jetting. Laser powder bed fusion involves depositing a layer of powder on a build plate and fusing selective portions of the powder using a ytterbium fiber laser that scans a computer-aided design (CAD) pattern. Laser powder bed fusion may include selective laser melting or sintering. At least portions of the monolithic body could be printed using DED, which prints at a very fast rate. For example, DED could be used to print the housing of the manifold, which could then be fused directly with the more intricate pipes that extend from the housing. Binder jetting creates a part by intercalating metal powder and polymer binding agent that bind the particles and layers together without the use of laser heating. The material of the monolithic body may be selected based at least in part on the proposed method of additive manufacturing. For example, the binder jet materials that include the binder and the metal (or ceramic, or cermet) may make the green form (e.g., the shape prior to sintering). The green form might be in the final shape, or may be shaped so that the sintered form is the final shape.

In an embodiment, the monolithic body of the manifold includes a metal material. For example, the layers of material that are stacked and fused together during the build process include the metal material. The metal material may be in the form of powder, a filament, or the like. The metal material may include or represent aluminum alloys, titanium alloys, cobalt chrome alloys, stainless steel, nickel alloys, or the like. Optionally, the monolithic body may include at least one plastic or ceramic material in addition to, or instead of, the metal material.

FIG. 16 is a cross-sectional view of the manifold shown in FIGS. 11 through 15. The cross-section is taken along line 16-16 shown in FIG. 13. The monolithic body includes a chamber 330 within the housing that is used to store compressed fluid, at least temporarily. The chamber may represent the chamber of the manifold shown in FIG. 9. The cross-section extends through the chamber, the supply pipe, the pantograph pipe, and the valve pipe. The cross-section does not extend through the pilot pipe or the sense pipe, which are not shown in FIG. 16. The monolithic body may define several flow channels therethrough.

The housing laterally extends from a first lateral side 333 to a second lateral side 335. The first lateral side may be disposed along the first lateral end (e.g., left end) of the manifold, and the second lateral side may be disposed along the second lateral end (e.g., right end) of the manifold. The housing vertically extends from a top side 329 to a bottom side 331. The bottom side may define the bottom end of the manifold. The chamber may be positioned at or proximate to the first or left lateral side. The valve pipe, the supply pipe, and the pantograph pipe may be positioned at or proximate to the second or right lateral side.

The flow channels include a first flow channel 332 that is fluidly connected to the valve pipe. The first flow channel extends from the distal end of the valve pipe to an opposite, inlet end 350 along the bottom end of the manifold, which is fluidly connected to the distributor. The first flow channel may define the secondary inlet line 158 shown in FIGS. 9 and 10. The end of the first flow channel along the bottom defines the inlet end 350 that receives compressed fluid to supply the secondary chamber of the main valve. The flow channels may include a second flow channel 334 that is fluidly connected to the supply pipe, and a third flow channel 336 that is fluidly connected to the pantograph pipe. In the illustrated orientation, the supply pipe and the second flow channel are disposed to the left of the pantograph pipe and the third flow channel. In an alternative embodiment, the supply pipe and the second flow channel may be disposed to the right of, in front of, and/or behind the pantograph pipe and the third flow channel.

The second and third flow channels merge within the monolithic body to define a combined flow channel 352. The combined flow channel extends to an outlet end 354 that is for fluid attachment to the distributor. The outlet end of the combined flow channel is discrete and separate from the inlet end of the first flow channel, being separated by a wall 356 along the length of the channels within the manifold. The first flow channel is fluidly isolated, via the wall, from the second flow channel, the third flow channel, and the combined flow channel throughout the interior of the manifold. The first, second, third, and combined flow channels may be positioned adjacent to the chamber in a directed towards the second (or right) lateral side of the housing.

In the illustrated embodiment, the combined flow channel is disposed below the second and third flow channels, where below is relative to a direction extending from the top side 329 of the housing towards a bottom side 331 of the housing. The second and third flow channels are disposed more towards the top side, and the combined flow channel is disposed more towards the bottom side. A longitudinal axis of the combined flow channel, proximate to the bottom side of the housing, may be generally parallel (e.g., plus or minus 5 degrees) to respective longitudinal axes of the second flow channel and the third flow channel, proximate to the top side of the housing. As such, the manifold reflects a lack of major bends or other flow impediments from the second and third flow channels to the combined flow channel, and to the distributor device fluidly connected to the outlet end thereof. The inlet end of the valve pipe (e.g., the first flow channel) and the outlet end of the combined flow channel represent fluidly isolated openings along the bottom side of the housing.

In an embodiment, the distal end of the valve pipe extends out the second (e.g., right) lateral side 335 along the right end of the manifold. A longitudinal axis of the valve pipe along the distal end may be oriented generally laterally or transverse (e.g., perpendicular plus or minus 30 degrees) relative to respective longitudinal axes of the combined flow channel, the second flow channel, and the third flow channel within the manifold. The first flow channel, defined in part by the valve pipe, may be positioned at the second (or right) lateral side of the housing adjacent to the second flow channel, the third flow channel, and/or the combined flow channel.

The flow channels may include a chamber outlet port 338 that extends through a wall of the housing into the chamber. The chamber outlet port, in the illustrated embodiment, is disposed along a bottom wall 339 of the monolithic body at the bottom end. The chamber outlet port connects the chamber to the distributor, such that fluid from an interior of the chamber can flow through the chamber outlet port along the bottom side of the housing to the distributor device. The chamber outlet port may define the control line 154 shown in FIGS. 9 and 10. When the distributor device is mounted to the manifold along the bottom end, the chamber outlet port, the inlet end of the first fluid channel, and the outlet end of the second fluid channel may align with different corresponding openings of the distributor device. When mounted to the distributor, compressed fluid is transferred between the manifold and the distributor through the flow channels.

In the illustrated embodiment, the housing of the monolithic body includes at least one interior wall. A first interior wall 340 is disposed between the chamber and the second and third flow channels, which merge to form the combined flow channel. The first interior wall has a first side 342 and a second side 344 that is opposite the first side. The chamber of the housing is located on the first side of the interior wall in the illustrated embodiment, and the various pipes and associated flow channels, are located on the second side of the interior wall. In an embodiment, an aperture (e.g., channel) 358 is defined through a thickness of the first interior wall. The aperture fluidly connects the chamber to the first flow channel, the second flow channel, and/or the combined flow channel. In the illustrated embodiment, the aperture is directly connected to the second flow channel. The aperture may define the chamber line 134 shown in FIGS. 9 and 10. Some of the compressed fluid that is received into the manifold via the supply pipe may flow through the aperture into the chamber to fill the chamber and supply fluid through the chamber outlet port.

Although not shown in the illustrated cross-section, the pilot pipe 323 shown in FIG. 12 may define a corresponding pilot flow channel through the interior of the manifold. The pilot flow channel may define the pilot inlet line 156 shown in FIGS. 9 and 10. The pilot flow channel may be fluidly connected to the second flow channel and/or the merged flow channel via an opening or hollow segment that defines the valve line 136 shown in FIGS. 9 and 10. The pilot flow channel may extend from the distal end of the pilot pipe through the manifold to an inlet port at the bottom end of the manifold. The inlet port may be fluidly connected to the distributor via a corresponding fluid connection point of the distributor that is discrete and spaced apart from the other fluid connection points of the distributor. For example, the inlet port of the pilot flow channel is isolated from the other ports 338, 354, 350 that connect to the distributor. In the illustrated embodiment, the manifold may define at least four discrete fluid connection points with the distributor, as generically illustrated in FIGS. 9 and 10.

In an alternative embodiment, the manifold may lack the valve pipe and the first flow channel. For example, the distributor device may be directly coupled to the main valve to define a direct fluid connection from the distributor device to the main valve without extending through the manifold.

A technical effect of forming the manifold as a monolithic body via additive manufacturing is an ability to achieve irregular shapes and contours. For example, the flow channels may be designed to reduce the distance that compressed fluid from the expansible device has to traverse within the manifold before being emitted from the outlet aperture of the main valve. The flow channels may have curved contours, which may enable greater fluid flow rate through the manifold relative to harder, more angular contours. The result achieved is a relatively quick automated drop or retraction of the pantograph in response to occurrence of a leak event in the detection line. The positioning system enables the pantograph to drop in excess of a regulated requirement within one second of the leak event, such as 1.5 times the required distance. For example, the positioning system may drop the pantograph at least 30 cm within one second of the leak event, such as at least 35 cm within one second.

The monolithic body of the manifold according to an embodiment may have a compact size. The volume of the chamber in the housing may be less than 0.5 L, and optionally no greater than 0.3 L. The compact size may beneficially limit the weight of the manifold, reducing overall vehicle weight. In an embodiment, the monolithic body may weigh less than 1 kg, and optionally may weigh less the 0.5 kg.

Forming the monolithic body of the manifold avoids the collection and assembly of several discrete individual parts, which may represent save costs and increase manufacturing efficiency. Furthermore, the monolithic body reduces the risk of leaks forming at interfaces between different components that are assembled together, because there are few such interfaces. The layout of the manifold provides enhanced pantograph auto-drop performance in a compact, lightweight form factor.

FIG. 17 is a front view of a manifold 400 of the positioning system according to another embodiment. The manifold has a monolithic body 402. The monolithic body of the manifold in FIG. 17 includes a portion of a main valve 404. The main valve may perform the same operations as the main valve shown in FIGS. 9 and 10. The main valve is shown in an exploded view in FIG. 17. The main valve includes a first housing portion 406, a second housing portion 408, and a membrane 410 (or diaphragm). In the illustrated embodiment, the first housing portion of the main valve is integrally connected to the valve pipe. For example, the first housing portion of the main valve is an integrated part of the monolithic body of the manifold. The first housing portion may be additively manufactured during a common build process with the remainder of the monolithic body. After the monolithic body is formed, the main valve may be assembled by coupling the second housing portion to the first housing portion. The membrane is encased between the coupled housing portions. The housing portions may be coupled via fasteners 412, such as bolts, clips, latches, or the like. Optionally, the first housing portion may define the secondary chamber of the main valve shown in FIGS. 9 and 10, and the second housing portion may define the pilot chamber. The hollow connection member 207 shown in FIG. 11 may couple to the second housing portion.

Integrating the first housing portion of the main valve onto the end of the valve pipe may reduce the number of parts of the positioning system and the number of connections that are made during the assembly process, by at least one. Optionally, other components may be integrated onto the monolithic body of the manifold. For example, a portion of the distributor may be formed as part of the monolithic body.

FIG. 18 is a flow chart of a method 500 for assembling a pantograph positioning system according to an embodiment. The positioning system may extend and retract the pantograph relative to a vehicle. The pantograph may be mounted on the vehicle. Alternatively, the pantograph may be mounted to an off-board power system, and extends from the off-board system towards a vehicle to contact the vehicle. The method may be performed to achieve the positioning system shown in FIGS. 9 and 10. The method optionally may include more steps than shown in FIG. 18, fewer steps than shown in FIG. 18, and/or different steps than shown in FIG. 18. Furthermore, the order of the steps presented in FIG. 18 may be rearranged unless explicitly stated and unless such a rearranged order would not be practically feasible.

At step 502, a manifold is additively manufactured to have a monolithic body that includes a housing, a supply pipe, a pantograph pipe, and a valve pipe. The manifold is additively manufactured by repeatedly depositing layers of material in a stack and fusing the layers of material together to form the monolithic body. The layers of material that are stacked and fused together may include a metal material. The manifold may be additively manufactured on a build plate of an additive manufacturing system that automates the build process. The housing of the monolithic body is formed to define a chamber that may hold a fluid (e.g., a compressed fluid). The supply pipe, the pantograph pipe, and the valve pipe project from the housing. The supply pipe, the pantograph pipe, and the valve pipe may be seamlessly connected to the housing.

In an embodiment, additively manufacturing the manifold may include forming at least one interior wall of the housing to fluidly isolate the chamber from the supply pipe, the pantograph pipe, and the valve pipe along the manifold. An interior wall of the housing may be formed such that the chamber is located on a first side of the interior wall and the supply pipe, the pantograph pipe, and the valve pipe are located on a second side of the interior wall. Optionally, the manifold may be additively manufactured such that the manifold weighs no more than 0.5 kg, and the chamber has a volume no greater than 0.5 L.

At step 504, the supply pipe is fluidly coupled to a fluid supply unit. The fluid supply unit is a source of compressed fluid. The supply pipe may be coupled to the fluid supply unit via one or more (first) hollow members. The manifold may receive the compressed fluid through the hollow member(s).

At step 506, the pantograph pipe is fluidly coupled to an expansible device. The expansible device may be mechanically connected to the pantograph. The expansible device may raise the pantograph as the expansible device expands and lower the pantograph as the expansible device contracts. The pantograph pipe may be coupled to the expansible device via one or more (second) hollow members.

At step 508, at least part of a main valve is mounted to the valve pipe. The main valve is actuatable to control flow of the compressed fluid through the manifold. In an embodiment, the main valve is a discrete component that is assembled and then mounted to a distal end of the valve pipe. In an alternative embodiment, additively manufacturing the manifold at step 502 may include forming a first housing portion of the main valve at a distal end of the valve pipe such that the first housing portion of the main valve is part of the monolithic body of the manifold. The method may include coupling the first housing portion to a second housing portion of the main valve to enclose a membrane of the main valve.

At step 510, a distributor device is mounted to the manifold, along an exterior surface of the monolithic body. The distributor device may be mounted to the manifold to be fluidly connected to the chamber, the supply pipe, the pantograph pipe, and the valve pipe. The distributor device may include one or more distributor valves that control the supply of compressed fluid to different chambers of the main valve. The distributor device may be actuatable based on a pressure in a control line received from the chamber of the manifold.

The vehicle associated with the power transfer system described herein may be a rail vehicle (e.g., a locomotive), a truck (e.g., highway semi-truck, mining truck, logging truck, or the like), bus, van, car, water vessel (e.g., tug, barge), and the like. Some suitable vehicles may have electric drive systems, which may be powered (when using on-board power) using fuel cells or batteries. In one embodiment, the overhead line shown in FIGS. 9 and 10 is a component of a charging station for an electric vehicle.

In an embodiment, a positioning system for a pantograph includes a contact strip, a main valve, a supply line, at least one feeder line, and a detection line. The contact strip may be fastened to a pantograph and may contact a power line. The contact strip may be equipped with a wear detection circuit that may be supplied a fluid. The main valve may include a pilot chamber and a secondary chamber, which are separated by a membrane. The main valve may define an outlet aperture fluidly connected to the secondary chamber. The membrane may be movable between a closed position, in which the membrane blocks the outlet aperture, and an open position, in which the membrane does not block the outlet aperture, allowing evacuation of the fluid from the main valve to the atmosphere. The supply line may be fluidly connected to a fluid supply unit and may supply the fluid to the secondary chamber of the main valve. The at least one feeder line may be fluidly connected to the fluid supply unit and may feed the fluid to the pilot chamber of the main valve. The detection line may extend from the pilot chamber of the main valve to the wear detection circuit of the contact strip.

Optionally, the membrane of the main valve lacks an aperture. The positioning system may include a monolithic body defined by layers of material that are stacked and fused together. The monolithic body may define at least a portion of the supply line and at least a portion of the at least one feeder line. The monolithic body of the manifold may include a housing, a supply pipe projecting from the housing and configured for connection to the fluid supply unit, a pantograph pipe projecting from the housing and configured for connection to an expansible device mechanically connected to the pantograph, and a valve pipe projecting from the housing and configured for connection to the main valve. The housing may define a chamber that holds the fluid. The valve pipe may define a portion of a first flow channel within the housing. The supply pipe may define a portion of a second flow channel within the housing. The pantograph pipe may define a portion of a third flow channel within the housing. The second flow channel and the third flow channel may merge within the housing into a combined flow channel. The combined flow channel may extend to an outlet end that may be fluidly attached to a distributor device mounted to the manifold. The first flow channel within the housing may be fluidly isolated from the second flow channel, the third flow channel, and the combined flow channel. Optionally, the layers of material that are stacked and fused together may include at least one metal material.

The positioning system may include a distributor device mounted to the manifold and fluidly connected to the supply line and the at least one feeder line. The distributor device may be operable in a first distribution position and a second distribution position. The distributor device in the first distribution position may establish a first flow path from the fluid supply unit to one of the feeder lines for supplying the fluid to the pilot chamber of the main valve. The distributor device in the second distribution position may establish a second flow path from the fluid supply unit to the supply line for supplying the fluid to the secondary chamber of the main valve.

The at least one feeder line may include a branch feed line fluidly connected to the pilot chamber of the main valve. The branch feed line may include a restriction with a cross-sectional passage size that is less than a cross-sectional passage size of the supply line. In response to a leak event occurring along the wear detection circuit of the contact strip, a pressure differential within the main valve may move the membrane to the open position, and the fluid from an expansible device mechanically connected to the pantograph may be conveyed through the supply line to the secondary chamber of the main valve and out of the main valve through the outlet aperture.

In an embodiment, a positioning system for a pantograph includes a main valve and a manifold. The main valve may include a pilot chamber and a secondary chamber, which are separated from each other by a membrane. The main valve may define an outlet aperture fluidly connected to the secondary chamber. The membrane may be movable between a closed position, in which the membrane blocks the outlet aperture, and an open position, in which the membrane does not block the outlet aperture. The manifold may include a monolithic body defined by layers of material that are stacked and fused together. The monolithic body may include a housing and a valve pipe. The valve pipe may be connected to the main valve, and may define a portion of a first flow channel through the manifold to convey the fluid to the secondary chamber of the main valve. Actuation of the main valve from the closed position to the open position may allow the fluid in an expansible device, that is mechanically connected to the pantograph, to evacuate through the first flow channel of the manifold and through the outlet opening of the main valve, which retracts the pantograph.

Optionally, the monolithic body of the manifold includes a supply pipe connected to a fluid supply unit and a pantograph pipe connected to the expansible device. The valve pipe, the supply pipe, and the pantograph pipe may all project from the housing. The supply pipe may define a portion of a second flow channel within the housing, and the pantograph pipe may define a portion of a third flow channel within the housing. The second flow channel and the third flow channel may merge within the housing into a combined flow channel that extends to an outlet end. The outlet end may be fluidly attached to a distributor device mounted to the manifold. The manifold may define a branch line through the housing. The branch line may be fluidly connected to the pilot chamber. At least a section of the branch line may include a restriction to limit a flow rate of the fluid through the branch line. Optionally, the housing defines a chamber configured to hold the fluid. The chamber may be fluidly connected to a second flow channel within the housing via an aperture through an interior wall of the housing. The second flow channel and the chamber may be fluidly isolated from the first flow channel.

Optionally, the membrane of the main valve lacks an aperture. The positioning system may include a distributor device mounted to the manifold, and operable in a first distribution position and a second distribution position. The distributor device in the first distribution position may establish a first flow path from a fluid supply unit through the manifold and the distributor device to the pilot chamber of the main valve. The distributor device in the second distribution position may establish a second flow path from the fluid supply unit through the manifold and the distributor device to the secondary chamber of the main valve.

In an embodiment, a positioning system for a pantograph includes a manifold that has a monolithic body defined by layers of material that are stacked and fused together. The monolithic body may include a housing, a supply pipe, a pantograph pipe, and a valve pipe. The housing may define a chamber configured to hold a fluid. The supply pipe may project from the housing and may connect to a fluid supply unit. The pantograph pipe may project from the housing and may connect to an expansible device mechanically connected to the pantograph. The valve pipe may project from the housing and may connect to a main valve that is actuatable to control flow of the fluid through the manifold.

Optionally, the valve pipe defines a portion of a first flow channel within the housing; the supply pipe defines a portion of a second flow channel within the housing; and the pantograph pipe defines a portion of a third flow channel within the housing. The second flow channel and the third flow channel may merge within the housing into a combined flow channel. The combined flow channel may extend to an outlet end configured to be fluidly attached to a distributor device mounted to the manifold. The supply pipe and the pantograph pipe may extend upwards from a top side of the housing, and the valve pipe may extend outward from a first lateral side of the housing.

In an embodiment, a positioning system for a pantograph includes a contact strip, a main valve, a manifold, and a detection line. The contact strip is configured to be fastened to a pantograph and to contact a power line. The contact strip is equipped with a wear detection circuit configured to be supplied a fluid. The main valve includes a pilot chamber and a secondary chamber, which are separated by a membrane. The main valve defines an outlet aperture fluidly connected to the secondary chamber. The membrane is movable between a closed position, in which the membrane blocks the outlet aperture, and an open position, in which the membrane does not block the outlet aperture, allowing evacuation of the fluid from the main valve to the atmosphere. The manifold includes a monolithic body defined by layers of material that are stacked and fused together. The monolithic body defines at least a portion of a supply line that is configured to be fluidly connected to a fluid supply unit and to supply the fluid to the secondary chamber of the main valve. The monolithic body also defines at least a portion of at least one feeder line that is configured to be fluidly connected to the fluid supply unit and to feed the fluid to the pilot chamber of the main valve. The detection line extends from the pilot chamber of the main valve to the wear detection circuit of the contact strip.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The inventive subject matter is not limited to the examples described and illustrated.

What is claimed is:

1. A positioning system for a pantograph, the positioning system comprising:
    a contact strip configured to be fastened to a pantograph and to contact a power line, the contact strip equipped with a wear detection circuit configured to be supplied a fluid;
    a main valve including a pilot chamber and a secondary chamber, which are separated by a membrane, the main valve defining an outlet aperture fluidly connected to the secondary chamber, the membrane movable between a closed position, in which the membrane blocks the outlet aperture, and an open position, in which the membrane does not block the outlet aperture, allowing evacuation of the fluid from the main valve to the atmosphere;
    a supply line configured to be fluidly connected to a fluid supply unit and to supply the fluid to the secondary chamber of the main valve;
    at least one feeder line configured to be fluidly connected to the fluid supply unit and to feed the fluid to the pilot chamber of the main valve; and
    a detection line that extends from the pilot chamber of the main valve to the wear detection circuit of the contact strip.

2. The positioning system of claim 1, wherein the membrane of the main valve lacks an aperture.

3. The positioning system of claim 1, further comprising a manifold comprising a monolithic body defined by layers of material that are stacked and fused together, the monolithic body defining at least a portion of the supply line and at least a portion of the at least one feeder line.

4. The positioning system of claim 3, wherein the monolithic body of the manifold includes a housing, a supply pipe projecting from the housing and configured for connection to the fluid supply unit, a pantograph pipe projecting from the housing and configured for connection to an expansible device mechanically connected to the pantograph, and a valve pipe projecting from the housing and configured for connection to the main valve, the housing defining a chamber configured to hold the fluid.

5. The positioning system of claim 4, wherein the valve pipe defines a portion of a first flow channel within the housing, the supply pipe defines a portion of a second flow channel within the housing, and the pantograph pipe defines a portion of a third flow channel within the housing, the second flow channel and the third flow channel merge within the housing into a combined flow channel, the combined flow channel extending to an outlet end configured to be fluidly attached to a distributor device mounted to the manifold.

6. The positioning system of claim 5, wherein the first flow channel within the housing is fluidly isolated from the second flow channel, the third flow channel, and the combined flow channel.

7. The positioning system of claim 3, further comprising a distributor device mounted to the manifold, the distributor device fluidly connected to the supply line and the at least one feeder line, the distributor device operable in a first distribution position and a second distribution position, the distributor device in the first distribution position configured to establish a first flow path from the fluid supply unit to one of the feeder lines for supplying the fluid to the pilot chamber of the main valve, the distributor device in the second distribution position configured to establish a second flow path from the fluid supply unit to the supply line for supplying the fluid to the secondary chamber of the main valve.

8. The positioning system of claim 3, wherein the layers of material that are stacked and fused together comprise at least one metal material.

9. The positioning system of claim 1, wherein the at least one feeder line includes a branch feed line fluidly connected to the pilot chamber of the main valve, the branch feed line including a restriction with a cross-sectional passage size that is less than a cross-sectional passage size of the supply line.

10. The positioning system of claim 1, wherein the positioning system is configured, in response to a leak event occurring along the wear detection circuit of the contact strip, for a pressure differential within the main valve to move the membrane to the open position and the fluid from an expansible device mechanically connected to the pantograph to be conveyed through the supply line to the secondary chamber of the main valve and out of the main valve through the outlet aperture.

* * * * *